(12) United States Patent
Dahan

(10) Patent No.: US 9,454,450 B2
(45) Date of Patent: *Sep. 27, 2016

(54) MODELING AND TESTING OF INTERACTIONS BETWEEN COMPONENTS OF A SOFTWARE SYSTEM

(71) Applicant: CA, Inc., Islandia, NY (US)

(72) Inventor: Jean-David Dahan, Cedar Park, TX (US)

(73) Assignee: CA, Inc., Islandia, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/658,161

(22) Filed: Mar. 14, 2015

(65) Prior Publication Data

US 2015/0199249 A1    Jul. 16, 2015

Related U.S. Application Data

(63) Continuation of application No. 13/244,029, filed on Sep. 23, 2011, now Pat. No. 8,984,490, which is a continuation-in-part of application No. 13/155,363, filed on Jun. 7, 2011, now Pat. No. 8,966,454.

(60) Provisional application No. 61/407,008, filed on Oct. 26, 2010.

(51) Int. Cl.

| G06F 9/44 | (2006.01) |
|---|---|
| G06F 15/173 | (2006.01) |
| G06F 11/30 | (2006.01) |
| G06F 9/445 | (2006.01) |
| G06F 11/36 | (2006.01) |
| H04L 29/08 | (2006.01) |

(Continued)

(52) U.S. Cl.

CPC ............ *G06F 11/3006* (2013.01); *G06F 8/67* (2013.01); *G06F 11/3608* (2013.01); *H04L 1/00* (2013.01); *H04L 43/50* (2013.01); *H04L 67/34* (2013.01)

(58) Field of Classification Search

None
See application file for complete search history.

(56) References Cited

U.S. PATENT DOCUMENTS

| 5,450,586 A | 9/1995 | Kuzara et al. |
|---|---|---|
| 5,485,618 A | 1/1996 | Smith |
| 5,581,696 A | 12/1996 | Kolawa et al. |

(Continued)

FOREIGN PATENT DOCUMENTS

EP    869433    10/1998

OTHER PUBLICATIONS

LISA, 2.0 User's Guide, Interactive TKO, Feb. 27, 2003, pp. 1-130.

(Continued)

*Primary Examiner* — Lewis A Bullock, Jr.
*Assistant Examiner* — Mark Gooray
(74) *Attorney, Agent, or Firm* — Patent Capital Group

(57) ABSTRACT

A first network connection is identified between a first software component and a second software component. First data is received from the first software component identifying an amount of data sent over the first network connection. Second data is also received, from the second software component, that identifies the amount of data sent over the first network connection. Further, a particular transaction fragment involving the first and second software components over the first network connection is determined from the received first and second data. In some aspects, the particular transaction fragment can be used in the analysis of a transaction including the particular transaction fragment.

22 Claims, 16 Drawing Sheets

(51) Int. Cl.
*H04L 1/00* (2006.01)
*H04L 12/26* (2006.01)

(56) References Cited

U.S. PATENT DOCUMENTS

| | | |
|---|---|---|
| 5,642,511 A | 6/1997 | Chow et al. |
| 5,798,757 A | 8/1998 | Smith |
| 5,867,707 A | 2/1999 | Nishida et al. |
| 5,956,479 A | 9/1999 | McInerney et al. |
| 5,958,008 A | 9/1999 | Pogrebisky et al. |
| 5,999,988 A | 12/1999 | Pelegri-Llopart et al. |
| 6,002,871 A | 12/1999 | Duggan et al. |
| 6,038,395 A | 3/2000 | Chow et al. |
| 6,061,721 A | 5/2000 | Ismael et al. |
| 6,134,581 A | 10/2000 | Ismael et al. |
| 6,144,962 A | 11/2000 | Weinberg et al. |
| 6,189,138 B1 | 2/2001 | Fowlow et al. |
| 6,230,309 B1 | 5/2001 | Turner et al. |
| 6,249,882 B1 | 6/2001 | Testardi |
| 6,353,840 B2 | 3/2002 | Saito et al. |
| 6,381,628 B1 | 4/2002 | Hunt |
| 6,408,430 B2 | 6/2002 | Gunter et al. |
| 6,427,230 B1 | 7/2002 | Goiffon et al. |
| 6,463,578 B1 | 10/2002 | Johnson |
| 6,473,707 B1 | 10/2002 | Grey |
| 6,490,719 B1 | 12/2002 | Thomas |
| 6,513,155 B1 | 1/2003 | Alexander, III et al. |
| 6,557,011 B1 | 4/2003 | Sevitsky et al. |
| 6,558,431 B1 | 5/2003 | Lynch et al. |
| 6,587,969 B1 | 7/2003 | Weinberg et al. |
| 6,601,018 B1 | 7/2003 | Logan |
| 6,601,020 B1 | 7/2003 | Myers |
| 6,637,020 B1 | 10/2003 | Hammond |
| 6,662,188 B1 | 12/2003 | Rasmussen et al. |
| 6,668,371 B2 | 12/2003 | Hamilton et al. |
| 6,684,387 B1 | 1/2004 | Acker et al. |
| 6,785,882 B1 | 8/2004 | Goiffon et al. |
| 6,792,426 B2 | 9/2004 | Baumeister et al. |
| 6,826,716 B2 | 11/2004 | Mason |
| 6,851,118 B1 | 2/2005 | Ismael et al. |
| 6,895,578 B1 | 5/2005 | Kolawa et al. |
| 6,912,520 B2 | 6/2005 | Hankin et al. |
| 6,920,609 B1 | 7/2005 | Manber et al. |
| 6,941,298 B2 | 9/2005 | Chow et al. |
| 7,055,137 B2 | 5/2006 | Mathews |
| 7,065,745 B2 | 6/2006 | Chan |
| 7,149,734 B2 | 12/2006 | Carlson et al. |
| 7,240,328 B2 | 7/2007 | Beckett et al. |
| 7,310,777 B2 * | 12/2007 | Cirne .............. G06F 11/323 345/440.1 |
| 7,340,481 B1 | 3/2008 | Baer et al. |
| 7,340,725 B1 | 3/2008 | Robinson et al. |
| 7,343,587 B2 | 3/2008 | Moulden, Jr. et al. |
| 7,350,191 B1 | 3/2008 | Kompella et al. |
| 7,362,709 B1 | 4/2008 | Hui et al. |
| 7,382,371 B1 | 6/2008 | Ciabarra |
| 7,392,506 B2 | 6/2008 | Garcowski et al. |
| 7,392,507 B2 | 6/2008 | Kolawa et al. |
| 7,401,141 B2 | 7/2008 | Carusi et al. |
| 7,487,508 B2 | 2/2009 | Fu et al. |
| 7,512,840 B2 | 3/2009 | Martin et al. |
| 7,529,242 B1 * | 5/2009 | Lyle .............. H04L 45/00 370/392 |
| 7,721,265 B1 | 5/2010 | Xu et al. |
| 7,827,527 B1 | 11/2010 | Chiluvuri |
| 8,015,279 B2 * | 9/2011 | Christodoulou .... H04L 43/0817 370/216 |
| 8,028,272 B2 | 9/2011 | Eldridge et al. |
| 8,060,864 B1 | 11/2011 | Michelsen |
| 8,117,591 B1 | 2/2012 | Michelsen |
| 8,146,057 B1 | 3/2012 | Michelsen |
| 8,392,884 B2 | 3/2013 | Specchio et al. |
| 8,543,379 B1 | 9/2013 | Michelsen |
| 8,826,230 B1 | 9/2014 | Michelsen |
| 8,966,454 B1 | 2/2015 | Michelsen et al. |
| 8,984,490 B1 | 3/2015 | Dahan |
| 9,111,019 B2 | 8/2015 | Michelsen et al. |
| 9,128,694 B1 | 9/2015 | Michelsen |
| 9,235,490 B2 | 1/2016 | Dahan |
| 2002/0026535 A1 | 2/2002 | Srinivasan |
| 2002/0095291 A1 | 7/2002 | Sumner |
| 2003/0009433 A1 | 1/2003 | Murren et al. |
| 2003/0014216 A1 | 1/2003 | Lebow |
| 2003/0046663 A1 | 3/2003 | Rogers et al. |
| 2003/0051194 A1 | 3/2003 | Cabezas et al. |
| 2003/0078949 A1 | 4/2003 | Scholz et al. |
| 2003/0081003 A1 | 5/2003 | Kutay et al. |
| 2003/0088663 A1 | 5/2003 | Battat et al. |
| 2003/0163608 A1 | 8/2003 | Tiwary et al. |
| 2004/0025083 A1 | 2/2004 | Nanja et al. |
| 2004/0039993 A1 | 2/2004 | Kougiouris et al. |
| 2004/0068560 A1 | 4/2004 | Oulu et al. |
| 2004/0123272 A1 | 6/2004 | Bailey et al. |
| 2004/0194064 A1 | 9/2004 | Ranjan et al. |
| 2004/0225919 A1 | 11/2004 | Reissman et al. |
| 2004/0237066 A1 | 11/2004 | Grundy et al. |
| 2005/0097515 A1 | 5/2005 | Ribling |
| 2005/0102423 A1 * | 5/2005 | Pelavin .............. H04L 45/00 709/238 |
| 2005/0204201 A1 | 9/2005 | Meenakshisundaram et al. |
| 2005/0223365 A1 | 10/2005 | Smith et al. |
| 2006/0037000 A1 | 2/2006 | Speeter et al. |
| 2006/0048100 A1 | 3/2006 | Levy et al. |
| 2006/0059169 A1 | 3/2006 | Armishev |
| 2006/0129992 A1 | 6/2006 | Oberholtzer et al. |
| 2006/0206870 A1 | 9/2006 | Moulden, Jr. et al. |
| 2006/0225030 A1 | 10/2006 | Deffler |
| 2006/0265475 A9 | 11/2006 | Mayberry et al. |
| 2007/0169003 A1 | 7/2007 | Branda et al. |
| 2007/0258387 A1 | 11/2007 | Patel et al. |
| 2008/0090549 A1 * | 4/2008 | Vialen .............. H04L 12/2602 455/405 |
| 2008/0262797 A1 * | 10/2008 | Carusi .............. H04L 12/2602 702/186 |
| 2009/0049429 A1 | 2/2009 | Greifeneder et al. |
| 2009/0199274 A1 * | 8/2009 | Frazier .............. H04L 63/08 726/4 |
| 2011/0302235 A1 | 12/2011 | Monk et al. |
| 2015/0199256 A1 | 7/2015 | Michelsen et al. |
| 2015/0205704 A1 | 7/2015 | Michelsen |
| 2015/0205706 A1 | 7/2015 | Michelsen |
| 2015/0205709 A1 | 7/2015 | Michelsen et al. |
| 2015/0286560 A1 | 10/2015 | Michelsen |

OTHER PUBLICATIONS

LISA, 2.0 Developer's Guide, Interactive TKO, Mar. 13, 2003, pp. 1-23.

OASIS, "ebXML Test Framework Draft Document—Version 0.91", Dec. 2002, he Organization for the Advancement of Structured Information Standards, 92 pages.

Andrews et al., "Tool Support for Randomized Unit Testing", Jul. 2006, pp. 36-45.

Saff et al., "Automatic Test Factoring for Java", Nov. 2005, pp. 114-123.

Chang Liu, "Platform-Independent and Tool-Neutral Test Descriptions for Automated Software Testing", Jun. 2000.

Moy, J. "OSPF Version 2", IETF, RFC 2328, Apr. 1998 (p. 1-244).

Xiao, Xipeng et al., "Reducing Routing Table Computation Cost in OSPF," IEEE, 1999 (pp. 119-124).

Tanenbaum, Andrew S., "Structured Computer Organization," Prentice-Hall, Inc. 2nd Edition, 1984 (ISBN 0138544891, 11).

Case, J., et al., "A Simple Network Management Protocol (SNMP)," IETF, RFC 1157, May 1990 (pp. 1-36).

Abu-Hakima, Suhayya, et al., "A Common Multi-Agent Testbed for Diverse Seamless Personal Information Networking Applications," IEEE, IEEE Communications Magazine, Jul. 1998 (pp. 68-74).

Microsoft® Office, "FrontPage 2003 Product Guide," © 2003 Microsoft Corporation.

(56) References Cited

OTHER PUBLICATIONS

Robillard, M., "Representing Concerns in Source Code," Nov. 2003 (139 pages).
Sagar, "Reflection & Introspection: Objects Exposed," Java developers' Journal, May 1, 1998, (pp. 1-16).
Doucet, et al., "Introspection in System-Level Language Frameworks: Meta-Level vs. Integrated," Mar. 2003 (pp. 1-6).
Beltrame et al., "Exploiting TLM and Object Introspection for System-Level Simulation," Mar. 2006 (pp. 100-105).
Wright, et al., "Introspection of Java™ Virtual Machine Under Simulation," Jan. 2006 (pp. 1-26).

* cited by examiner t = x

450a

| CONNECTION | | AGENT 1 | | | | | | AGENT 2 | | | | | |
|---|---|---|---|---|---|---|---|---|---|---|---|---|---|
| ID | ACTIVE? | ID | PORT | IP | RESPONSE? | AMOUNT | I/O | ID | PORT | IP | RESPONSE? | AMOUNT | I/O |
| A | Yes | I | 49488 | 1.0.1.A | YES | 745 | OUT | III | 443 | 1.1.1.C | YES | 745 | IN |
| B | Yes | II | 65431 | 1.0.1.B | NO | -- | -- | III | 80 | 1.0.1.C | YES | 302 | IN |
| C | Yes | II | 51141 | 1.0.1.B | NO | -- | -- | IV | 80 | 1.0.0.D | NO | -- | -- |
| D | Yes | III | 80 | 1.1.1.C | YES | -- | -- | IV | 50648 | 1.0.0.D | YES | 432 | OUT |
| E | Yes | III | 60692 | 1.0.1.C | YES | 1105 | OUT | IV | 443 | 1.0.0.D | YES | 1105 | IN |
| F | No | II | 443 | 1.0.1.B | YES | 1122 | IN | III | 60000 | 1.1.1.C | YES | 1122 | OUT |
| G | Yes | I | 55555 | 1.0.1.A | YES | 202 | IN | -- | -- | -- | -- | -- | -- |

| CONNECTION | | AGENT 1 | | | | | | AGENT 2 | | | | | |
|---|---|---|---|---|---|---|---|---|---|---|---|---|---|
| ID | ACTIVE? | ID | PORT | IP | RESPONSE? | AMOUNT | I/O | ID | PORT | IP | RESPONSE? | AMOUNT | I/O |
| A | Yes | I | 49488 | 1.0.1.A | YES | 745 | OUT | III | 443 | 1.1.1.C | YES | 745 | IN |
| B | Yes | II | 65431 | 1.0.1.B | YES | 302 | OUT | III | 80 | 1.0.1.C | YES | 302 | IN |
| C | Yes | II | 51141 | 1.0.1.B | YES | 1452 | OUT | IV | 80 | 1.0.0.D | YES | 1452 | IN |
| D | Yes | III | 80 | 1.1.1.C | YES | 432 | IN | IV | 50648 | 1.0.0.D | YES | 432 | OUT |
| E | Yes | III | 60692 | 1.0.1.C | YES | 1105 | OUT | IV | 443 | 1.0.0.D | YES | 1105 | IN |
| G | Yes | I | 55555 | 1.0.1.A | YES | 202 | IN | -- | -- | -- | -- | -- | -- |

MODELING AND TESTING OF INTERACTIONS BETWEEN COMPONENTS OF A SOFTWARE SYSTEM

CROSS REFERENCE TO RELATED APPLICATIONS

This patent application is a continuation and claims the benefit of priority under 35 U.S.C. §120 to U.S. patent application Ser. No. 13/244,029, filed on Sep. 23, 2011, and entitled MODELING AND TESTING OF INTERACTIONS BETWEEN COMPONENTS OF A SOFTWARE SYSTEM, which application is a continuation-in-part of U.S. patent application Ser. No. 13/155,363, filed Jun. 7, 2011, now issued as U.S. Pat. No. 8,966,454, which application claims the benefit of priority to U.S. Provisional Patent Application Ser. No. 61/407,008, filed Oct. 26, 2010. The disclosures of the prior applications are considered part of, and are incorporated by reference in their entirety, in the disclosure of this application.

TECHNICAL FIELD

This invention relates to software testing and, more particularly, to testing service oriented architectures and similar systems that include multiple independent components.

BACKGROUND

In many testing scenarios, it is difficult to determine how each of several different components of a software system is affecting performance. For example, a software developer may be unable to determine whether a new application is responding too slowly due to performance problems within the application itself, network congestion affecting the application's interactions with a web server from which the application obtains data, or a sluggish database that the web server interacts with. Since each of these components may be implemented independently, it is difficult to be able to test all of the components in a manner that captures the interactions between the components. Furthermore, since some of the components may not allow modification of their code for testing purposes, this difficulty may be exacerbated.

SUMMARY

In general, one aspect of the subject matter described in this specification can be embodied in methods that include the actions of identifying a first network connection between a first software component and a second software component, receiving first data from the first software component identifying an amount of data sent over the first network connection, and receiving second data from the second software component identifying the amount of data sent over the first network connection. Further, a particular transaction fragment can be determined, from the first and second data, the transaction fragment involving the first and second software components over the first network connection.

In another general aspect of the subject matter described in this specification can be embodied in systems that include at least one processor device, at least one memory element, and an instrumentation broker. The instrumentation broker, when executed by the at least one processor device, can identify a first network connection between a first software component and a second software component, receive first data from the first software component identifying an amount of data sent over the first network connection, receive second data from the second software component identifying the amount of data sent over the first network connection, and determine, from the first and second data, a particular transaction fragment involving the first and second software components over the first network connection.

In yet another general aspect, subject matter described in this specification can be embodied in methods that include the actions of using an agent interfacing with a first software component to identify a first network connection between the first software component and a second software component. An amount of data exchanged between the first and second software components over the first network connection can be determined. A particular fragment indicator can be generated based on the amount of data. The particular fragment indicator can be sent to an instrumentation broker for use in the identification of a particular transaction fragment.

In another general aspect of the subject matter described in this specification can be embodied in systems that include at least one processor device, at least one memory element, and at least one instrumentation agent. The instrumentation agent, when executed by the at least one processor device, can identify a first network connection between a first software component and a second software component, determine an amount of data exchanged between the first and second software components over the first network connection, generate particular fragment indicator based on the amount of data, and send the particular fragment indicator to a instrumentation broker for use in the identification of a particular transaction fragment. The instrumentation agent can monitor the first software component.

These and other embodiments can each optionally include one or more of the following features. The first and second data can include an identification of the first network connection. The identification of the first network connection included in the first and second data can include a respective port identifier corresponding to each of the first and second software components and a respective IP address of each of the first and second software components. Determining the particular transaction fragment can include determining a correspondence between the first and second data based at least in part on the inclusion of the amount of data in each of the first and second data. Determining the correspondence between the first and second data can be based at least in part on identification of the first network connection in each of the first and second data. The first data can indicate that data sent over the first network connection was outbound relative to the first software component and the second data can indicate that the data sent over the first network connection was inbound relative the second software component. At least a portion of a transaction tress can be generated that identifies the first transaction fragment as included within a particular transaction. Sub-tree data can be received from the first software component describing one or more additional transaction fragments identified by an agent corresponding to the first software component. The particular transaction fragment can correspond to a first thread executed at the first software component, and the one or more additional transaction fragments can correspond to at least one other thread initiated through the execution of the first thread.

Further, embodiments can each optionally include one or more of the following additional features. A second network connection between the second software component and a third software component can be identified. Third data can be received from the second software component identifying a second amount of data sent over the second network connection, and fourth data can be received from the third software component identifying the second amount of data sent over the second network connection. A second transaction fragment involving the second and third software components over the second network connection can be determined from the third and fourth data, a second transaction. An association between the second and third data can be identified. It can be determined that the first and second transaction fragments are fragments in a common transaction. The second and third data can be received together from the second software component. The second and third data can be used to determine an order of the first and second transaction fragments within the common transaction. Determining the transaction fragments can include identifying agents corresponding to software components involved in identified network connections, and monitoring the identified agents for data describing amounts of data exchanged over the corresponding network connections.

Still further, embodiments can each optionally include one or more of the following additional features. A second network connection can be identified. Third data can be received from a first agent interfacing with the first software component, the third data identifying a particular amount of data exchanged over the second network connection. It can be concluded that no other data will be received, relating to the second network connection, from agents corresponding to software components participating in the second network connection. A second transaction fragment involving the first software component can be determined from the received third data. It can be identified from the third data that the data exchanged over the second network connection is outbound relative to the first software component. It can be further determined that the first software component is a root node in a transaction tree including at least the second transaction fragment. Alternatively, it can be identified, from the third data, that the data exchanged over the second network connection is inbound relative to the first software component, and it can be determined that the first software component is a leaf node in a transaction tree including at least the second transaction fragment. An unidentified software component participating in the second network connection can be determined that does not have a corresponding agent. Network connections can be TCP connections. The first data can be generated by a first agent interfacing with the first software component and the second data can be generated by a second agent interfacing with the second software component. A model generator can also be provided that is configured to generate a model of a particular transaction including the particular transaction fragment, the model adapted for display on a computing device and including a representation of the particular transaction fragment.

Embodiments can each optionally include one or more of the following additional features. The first software component can send the exchanged data to the second software component, and the particular fragment indicator can identify the amount of data as outbound relative to the first software component. A complimentary fragment indicator can be generated by a second agent corresponding to the second software component, the complimentary fragment indicator based on the amount of data exchanged between the first and second software components over the first network connection, and the particular transaction segment is identified based on an identified correlation between the particular fragment indicator and the complimentary fragment indicator. The first software component can receive the exchanged data, and the fragment indicator can identify the amount of data as inbound data relative to the first software component. Information can be sent to an instrumentation broker identifying the first network connection, such as through the particular fragment indicator. Such information can be used to identify that the agent operates in connection with the first network connection. Such information can be sent before sending the particular fragment indicator.

Further, embodiments can each optionally include one or more of the following additional features. The first network connection can be identified as corresponding to a particular software process executed by the first software component and identified from a plurality of network connections involving the first software component. The particular software process includes a particular execution thread and the first network connection is identified as corresponding to the particular operation based at least in part on an identification that the first network connection was initiated within the particular execution thread. The particular software process includes at least one particular execution thread that launches at least one child execution thread, and the launching of the at least one child execution thread by the particular execution thread can be identified by the agent. The particular execution thread can be identified as a parent of the child execution thread. Transaction fragment data can be generated corresponding to transaction fragments performed through the child execution thread. The transaction fragments performed through the child execution thread can be associated with the particular transaction fragment. Associating can include defining a relationship between the transaction fragments performed through the child execution thread with the particular transaction fragment based on the parent-child relationship of the particular execution thread to the child execution thread. The relationship between the transaction fragments can be defined by a transaction tree and at least one of the transaction fragments performed through the child execution thread is represented as a branch of a transaction tree node representing the particular transaction fragment. The generated transaction fragment data can be sent corresponding to transaction fragments performed through the child execution thread to the instrumentation broker. It can be determined whether transaction fragments performed through the child execution thread are relevant to a particular transaction including the particular transaction fragment. Determining whether transaction fragments performed through the child execution thread are relevant to the particular transaction can include previewing the particular software process by the agent. Determining whether transaction fragments performed through the child execution thread are relevant to the particular transaction can include determining whether the parent execution thread is at least partially dependent on data returned by the child execution thread. Child execution threads providing data upon which the corresponding parent execution thread is at least partially dependent can be determined to be relevant to the particular transaction.

Still further, embodiments can each optionally include one or more of the following additional features. Determining the amount of data exchanged between the first and second software components can include counting, at the first software component, the number of bytes exchanged over the first network connection. The agent interfacing with the first software component can be used to identify a second network connection between the first software component and another software component. A second amount of data exchanged between the first software component and the other software component over the first network connection can be determined. A second fragment indicator can be generated based on the second amount of data. The particular fragment indicator can be sent to the instrumentation broker for use in the identification of a second transaction fragment different from the particular transaction fragment.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

BRIEF DESCRIPTION OF THE DRAWINGS

A more complete understanding of the present invention may be acquired by referring to the following description and the accompanying drawings, in which like reference numbers indicate like features.

FIGS. 4A-4B are table diagrams representing example collected data that can be used by an example instrumentation broker;

Figure 1:
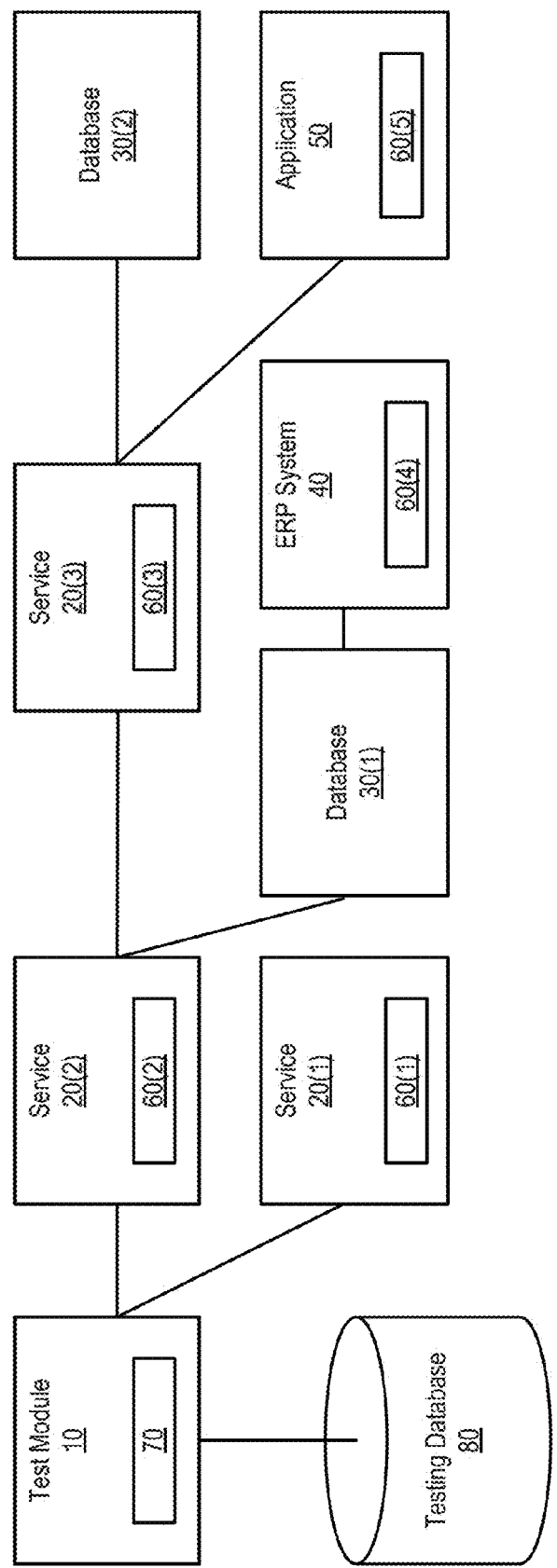
FIG. 1 is a block diagram of a test system in which a software architecture that includes multiple independent software components is being tested.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of an example test system in which a software architecture that includes multiple independent software components is being tested. As shown, the software architecture includes a test module 10, a plurality of services 20(1), 20(2), and 20(3), databases 30(1) and 30(2), an enterprise resource planning (ERP) system 40, and one or more applications 50. All or some of these components can be implemented in software that is executing on one or more computing devices (e.g., a personal computer, server, personal digital assistant, telephone, tablet computer, smartphone, or the like).

The components shown in FIG. 1 can all be implemented on the same computing device. However, in many embodiments, at least some of these components (or portions thereof) can be implemented on different computing devices, all or some of which can be coupled via one or more networks (e.g., a local area network, storage area network, and/or wide area network such as the Internet).

At least some of the components being tested by the test system may not yet be in production (i.e., these components are still in a development and/or testing phase), while other components may already be in production (e.g., these components have already been tested and released and are now being used in a production environment). The components that are still in development and/or undergoing testing are referred to as being pre-production components.

Each service 20(1)-20(3) can provide any of a variety of different services and can be implemented as any one or more of a variety of software components. For example, each service 20 can be a web service (e.g., having an interface defined by a web service definition language (WSDL) file), a web site (e.g., as implemented by one or more web pages provided by a web server), enterprise service, or the like. Services 20(1)-20(3) can each be implemented as an object or other component (e.g., an enterprise service bus (ESB) construct, an Enterprise JavaBean (EJB), a web component such as a JavaServer Pages (JSP) page or Java servlet component, other standalone Java component, or Java applet), as an application that includes any of the previously-mentioned components, or the like.

Databases 30(1) and 30(2) can each include a database server, database management system, and other utilities configured to assist in responding to requests to access information stored in a database. Application 50 can be any of a variety of different applications and can include any one or more of a variety of different software components. Other components that can be included in a testing system such as the one shown in FIG. 1 include a legacy application operating on a mainframe, a data service, an order manager, a transactional data store, an enterprise application integration (EAI) system, or the like.

Test module 10 is configured to execute a test case by sending requests to and receiving responses and other data from one or more of the components of the system under test. In this example, the test module executes a test case that calls services 20(1) and 20(2). In response to being called, each service should return a response to test module 10. Test module 10 can then verify that the response received from each service was the expected response. Service 20(1) generates its response independently, without needing to call any other service or component. In contrast, service 20(2)'s response is dependent upon database 30(1), which in turn can be dependent upon ERP system 40, and service 20(3), which in turn can depend on other databases (e.g., 30(2)), applications (e.g., 50) and the like.

To aid in monitoring the performance of the different components in the system under test, one or more of the components can include an instrumentation agent. In particular, service 20(1) includes instrumentation agent 60(1), service 20(2) includes instrumentation agent 60(2), service 20(3) includes instrumentation agent 60(3), ERP system 40 includes instrumentation agent 60(4), and application 50 includes instrumentation agent 60(5).

Instrumentation agents 60(1)-60(5) (collectively referred to herein as instrumentation agents 60) can be software-implemented agents that are configured to provide visibility into the operations of each instrumented component to test module 10. Each instrumentation agent 60 is configured to detect requests and responses being sent to and from the component in which that instrumentation agent is embedded. Each instrumentation agent 60 is configured to generate information about the detected requests and/or responses and to report that information to an instrumentation broker 70 that, in some instances, is coupled to, or otherwise associated with test module 10. Additionally, each instrumentation agent 60 can be configured to detect and report on activity that occurs internally to the component in which the instrumentation agent is embedded.

While the example of FIG. 1 illustrates a system in which there is one instrumentation agent per component, other embodiments may be implemented differently. For example, in some systems, there is a one-to-one correspondence between the number of instrumentation agents within a component and the number of processes (or other subcomponents) to be monitored within that component. In such embodiments, each instrumentation agent monitors and reports on its corresponding sub-component.

In response to detecting a request, response, and/or other activity to be monitored, each instrumentation agent 60 is configured to detect one or more characteristics associated with that activity and/or the monitoring of that activity by the instrumentation agent. The characteristics can include a frame identifier, which identifies a message, with respect to the instrumentation agent, sent by the instrumentation agent to the instrumentation broker to report the characteristics; a parent identifier, which identifies the requester that generated the request sent to the component or sub-component monitored by the instrumentation agent; a transaction identifier, identifying the transaction, with respect to the component or sub-component being monitored, such as transactions between components carried out through communications and calls made over one or more network connections; and an agent identifier that identifies the instrumentation agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, EJB method invocations, EJB entity lifecycle events, heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like.

As the above examples indicate, characteristic information can include information generated by the instrumentation agent itself and information generated and/or processed by the component or sub-component monitored by the instrumentation agent. The instrumentation agent then causes information identifying those characteristics to be provided to an instrumentation broker 70 within (as shown) or coupled to test module 10. In some embodiments, each instrumentation agent collects information to form a message, also referred to herein as a frame, which describes characteristics associated with both a detected request and a detected response corresponding to that request. In such embodiments, the instrumentation agent can wait for the response corresponding to the request to be generated and sent before sending the frame to the instrumentation broker.

Instrumentation agents 60 can monitor and report characteristics independently for each transaction in which the component (e.g., services 20, ERP system 40, application 50, etc.) being monitored participates. In addition to monitoring the performance of a single component and aggregating information about that component over a multitude of transactions (such that information about the performance of individual transactions can, for example, averaged, based upon the observed performance of the component over the course of performing the multitude of transactions), instrumentation agents 60 can additionally provide characteristics that are specific to and correlated with a specific transaction. More particularly, these characteristics that are monitored and reported by instrumentation agents 60 can be specific to and correlated with a particular request and/or response generated as part of a transaction.

Instrumentation agents 60 can monitor activity (e.g., such as receipt of a request from test module 10 and any responses or related activity generated in response to such a request) initiated by test module 10, as well as activity generated in response to requests received from other components beside test module 10. Thus, instrumentation agents 60 can provide information about individual transactions that are not necessarily part of a test case.

In some embodiments, the instrumentation agents 60 communicate with instrumentation broker 70 via a messaging system such as Java (TM) Message Service (JMS). For example, instrumentation broker 70 can create a messaging system topic for each transaction (referred to herein as a transaction frame (TF) topic) and subscribe to that TF topic. The instrumentation agents 60, upon startup, broadcast their existence to each other and/or to instrumentation broker 70. The instrumentation agents 60 can then get the TF topic from instrument broker 70 and begin publishing messages onto a message bus on that TF topic. Instrumentation broker 70 can monitor the published messages and determine whether those messages relate to the current TF topic. As needed, instrumentation broker 70 creates new TF topics for new transactions.

Instrumentation agents 60 can alternatively communicate with instrumentation broker 70 using techniques other than those involving messaging systems. For example, instrumentation agents 60 can write information to testing database 80 using database commands, and instrumentation broker 70 can monitor those database commands to detect new information.

Some instrumentation agents 60 can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an instrumentation agent configured to monitor an EJB can be configured as an EJB3 entity listener (e.g., to monitor entity beans) or interceptor (e.g., to monitor session beans). For example, in some implementations, instrumentation agents 60 can include functionality similar to functionality described, for instance, in U.S. patent application Ser. No. 11/328,510, titled "Instrumentation System and Method for Testing Software," filed Jan. 9, 2006, and listing John J. Michelsen as an inventor, which is hereby incorporated by reference in its entirety as if completely and fully set forth herein.

Some components (or their corresponding application servers) may not provide users with the ability to modify their code, and thus some instrumentation agents can be implemented externally to the component being monitored in a manner that can cause all requests and responses being sent to and/or from that component to be handled by the instrumentation agents. For example, for an existing database, an instrumentation agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the 'real' driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses to instrumentation broker 70.

In some embodiments, all or some of instrumentation agents 60 are configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the instrumentation agent to detect requests and responses, as well as the characteristics of those responses. In particular, this functionality can allow an instrumentation agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written.

Some instrumentation agents 60 are configured to monitor individual threads by monitoring the storage used by each thread (i.e., the thread local storage for that thread). Such instrumentation agents 60 can detect when the monitored thread begins reading or writing to a thread local variable in the thread local storage. In response to detecting this access to the thread local variable, the instrumentation agent tracks the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like.

As noted above, in some implementations, one of the characteristics that can be collected by instrumentation agents 60 is timing information, such as a timestamp, that indicates when a particular request was received or when a particular response was generated. As described in more detail below, such timing information can be used by instrumentation broker 70 to identify that frames received from different instrumentation agents 60 are related to the same transaction. In order to enable instrumentation broker 70 to rely on such information, the instrumentation agents 60 can be configured to synchronize the timers used by those agents to generate the timing information with similar times used by other instrumentation agents in the same system. In some instances, any one of a variety of conventional clock synchronization techniques can be used.

In another implementation, the flow, organization, hierarchy, or timing of a particular transaction can be identified through the generation of transaction identifiers that include characteristics collected by instrumentation agents 60 for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

As requests and responses progress through the test system, additional characteristic information is captured and sent to the instrumentation broker 70 by the instrumentation agents 60. For example, when test module 10 sends a request to service 20(2), instrumentation agent 60(2) can capture characteristic information associated with that request (e.g., the time at which the request was received, the sender of that request, the time at which corresponding requests were sent to database 30(1) and/or service 20(3), how much data was exchanged, the identity of the communication channel used in the request or response, and the like) and the corresponding response, and then send that characteristic information to instrumentation broker 70. Instrumentation agents 60 can send information to instrumentation broker 70 independently of each other, as well as independently of the progress of the test case.

The information returned to instrumentation broker 70 by instrumentation agents 60 is temporarily stored (e.g., in a log in testing database 80). Instrumentation broker 70 then organizes this information for more permanent storage in testing database 80. As organized by instrumentation broker 70, the information can be processed, manipulated, and displayed to users by test module 10, as described in more detail below.

Instrumentation broker 70 organizes the information so that information that describes characteristics of a portion, or fragment, of a particular transaction is grouped with other information describing the same transaction. Thus, instrumentation broker 70 groups individual frames, each of which can be received from a different instrumentation agent 60, into groups of frames that describe a complete transaction.

In some embodiments, in order to group frames, instrumentation broker 70 first sorts the frames based upon timing information associated with and/or included within those frames. After being sorted, the frames can be arranged in ascending or descending order, with respect to the timing information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information. In other examples, frames can be sorted, for example, based on an amount of data exchanged, the identity of a particular communication channel or network connection used, the identification of the particular agents that provided the frames, etc.

After sorting the frames, instrumentation broker 70 can then group the frames into transactions. In one embodiment, this act can involve looking at information indicating the amount of data that was received and/or generated, as detected by the instrumentation agent, as well as information identifying the components or sub-components involved in communicating with each other to cause the monitored activity. For example, such identity information can include information identifying the network ports (e.g., of the requester and responder) used to communicate a request and corresponding response between a requester and responder. This information can correlate two different frames that have similar timing information and data amounts, for example. For instance, in one example, instrumentation agent 60(2) can send a frame to instrumentation broker 70 indicating that, among other things, service 20(2) sent a request that was approximately 2K bytes in size to service 20(3) at 09:42:01. Instrumentation agent 60(3) can send a frame to instrumentation broker 70 indicating that, among other things, service 20(3) received a request that was approximately 2K in size from service 20(2) at 9:42:55. Based upon this information, instrumentation broker 70 can determine that the two frames describe different portions of the same transaction. It is noted that the amount of data identified in each frame is likely to not be identical, but may likely be similar. Similarly, the timing information may not be identical, but can likely be appropriately similar or conform to a particular threshold of acceptability, given the communication delays between the requester and responder. The timing and data amounts may be organized in respective columns within a database.

In some implementations, frames can be grouped into transactions based on the data amounts exchanged between components without regard to timing data. Indeed, in some examples, such an alternative approach can realize more economical and accurate transaction matching or stitching than an approach utilizing timing data. For example, agent can be used, in cooperation with an instrumentation broker (e.g., 70) to collect information pertaining to one or more network connections participated in by monitored software components. An agent can gather information from the perspective of the software component it monitors, by collecting such data as the IP address and port used by the software component during the connection, the amount of data exchanged over the network connection (i.e., measured from the time the network connection was established between components), as well as an indication of whether the amount of data is inbound or outbound relative to the software component, and, in some cases, the IP address and/or port number used by the software component on the other end of the network connection. Particular network connections within the system (e.g., 100) can be identified by comparing data describing network connections at the respective software component to identify participants in a common network connection (e.g., based on identification of common network connection parameters, including a similar amount of data sent over the connections). Identified network connections can be mapped to a particular portion, or fragment, of a transaction, and such fragments can be grouped (e.g., using the collected network connection description data) to identify particular transactions involving multiple different software components (and network connections), among other examples.

Instrumentation broker 70 can group frames into the same transaction by adding a transaction identifier to (or modifying an already-present transaction identifier within) the characteristic information included in each frame. In particular, each frame identified as corresponding to the same transaction is associated with the same transaction identifier. In one embodiment, the transaction identifier used for all of the frames associated with the same transaction is the transaction identifier associated with the first (i.e., earliest) frame associated with that transaction. Generally, transaction identifiers are generated in such a manner that the each transaction identifier will be unique throughout time with respect to a given testing system. The transaction identifiers can be organized into a transaction column within a database and can, in at least some embodiments, be used as a primary key.

Within a group of frames associated with the same transaction, instrumentation broker 70 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the instrumentation agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself. The parent and frame identifiers can be organized into respective columns within a database.

As shown in FIG. 1, some components tested by the testing system do not include instrumentation agents. Accordingly, some of the activity that occurs within a transaction may not be fully identified in any of the frames received from the instrumentation agents. Instrumentation broker 70 is configured to detect these situations and to generate appropriate frames corresponding to or modeling the uninstrumented components. These frames are referred to herein as synthetic frames. Synthetic frames may not contain as much information as is included in frames generated by instrumentation agents.

To detect situations in which a synthetic frame is needed, instrumentation broker 70 keeps track of all of the instrumentation agents included in the testing system, as well as the components or sub-components monitored by those instrumentation agents. Instrumentation broker 70 processes all of the frames in the same transaction. For instance, if a particular frame indicates that a request was received from a component that is not being monitored by an instrumentation agent, instrumentation broker 70 can create a synthetic frame for that requester. This synthetic frame's frame identifier can then be set as the value of the parent identifier in the non-synthetic frame that identified the request received from the unmonitored component. Similarly, if a particular frame indicates that a request was sent to a component that is not being monitored by an instrumentation agent, instrumentation broker 70 can create a synthetic frame for the responder to which the request was sent. The parent identifier of the synthetic frame can be set to indicate the frame that identified the request. The synthetic frames can have the same transaction identifier as the frames that triggered creation of the synthetic frame.

Instrumentation broker 70 can include information such as a frame identifier, transaction identifier, IP address, port, data included in a request and/or response, and timing information in a synthetic frame. This information can be generated by instrumentation broker 70 from information in other non-synthetic frames or even copied from other non-synthetic frames. For example, the timing information can be calculated based upon a time at which the component represented by the synthetic frame was sent a request by a requester and the time at which the requester received a response back from the component. The IP address and port can be copied from a parent or child frame (a frame is a child frame of a parent frame, for instance, if that frame identifies the parent frame in its parent frame identifier field or can otherwise be identified as child frame, such as through the identification that a transaction fragment represented by the child frame is a child of a parent transaction (e.g., within a tree model of the transaction or software process).

In some situations, a synthetic frame can be created in response to processing one non-synthetic frame, and then subsequently linked to another non-synthetic frame through the use of a parent identifier. For example, in the example of FIG. 1, instrumentation broker 70 can receive non-synthetic frames from instrumentation agent 60(2), which monitors service 20(2), and instrumentation agent 60(4), which monitors ERP system 40. Database 30(1) is not instrumented, and thus no agent is available to generate frames corresponding to activity in database 30(1). Accordingly, in response to, for example, processing a first non-synthetic frame received from agent 60(4), instrumentation broker can create a synthetic parent frame for the first frame that corresponds to activity in database 30(1). Subsequently, when processing a second non-synthetic frame received from instrumentation agent 60(2), instrumentation broker 70 can detect that the second frame describes a request sent to database 30(1). Accordingly, instrumentation broker 70 can set the synthetic frame's parent frame identifier to indicate the second frame.

Once the information is organized and stored in testing database 80, test module 10 can extract that information, process the extracted information, display that information (or graphics or text representing that information) to a user, and/or allow a user to manipulate a test case based upon that information. For example, the test module can use the information in testing database 80 to identify which components were involved in the execution of the test case; in order to identify response times for certain system components, based upon the differences in request and response times; and the like, and to display that information to a user.

Figure 12:
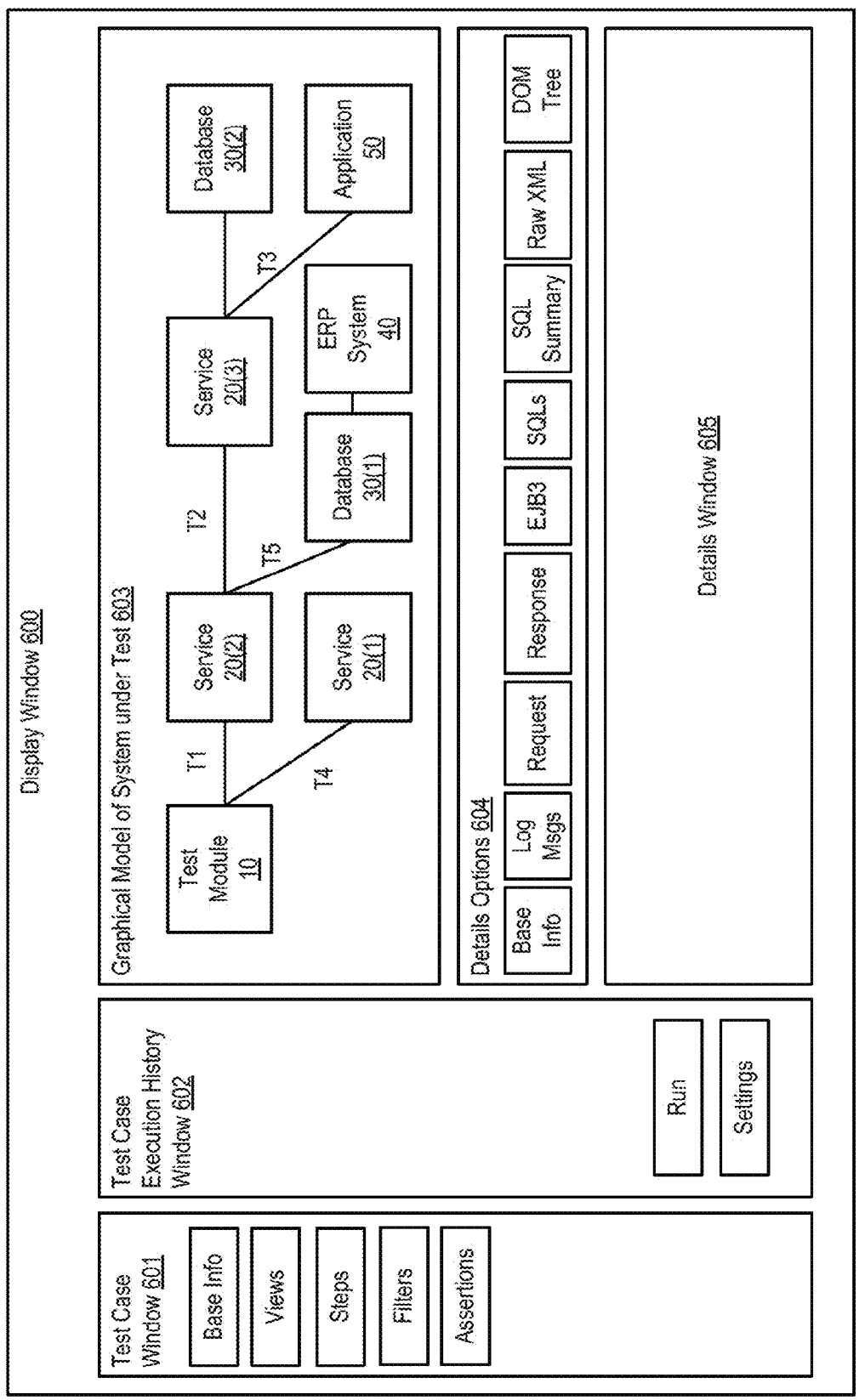
FIG. 12 is a block diagram of a display window that includes a model of a test system and allows a user to interact with the test system via the model.

Test module 10 can display the processed information to a user in a display window such as that shown in FIG. 12. The displayed information can identify each component or sub-component that was involved in the test case (e.g., each of the components shown in FIG. 1). The user can then manipulate the displayed information in order to see details of the testing process and/or modify a test case.

As noted above, the characteristic information captured by the instrumentation agents 60 distributed throughout the system can describe individual requests and/or responses that test module 10 (and the services 20(1) and 20(2) being called by test module 10) would otherwise not have access to. Thus, the information displayed to the user can include information describing activity (e.g., each transaction can include a request and its corresponding response, as well as any requests and responses performed as different components were called in the process of generating the corresponding response) to which test module 10 was not a party. Accordingly, even though test module 10 does not directly communicate with certain components of the test system, test module 10 can nevertheless display information representing those components and characteristics of transactions in which those components participated. Thus, a user can now view information describing which and how components interact in response to a single test case executed by a single test module, without needing to create independent test cases and/or test modules for each component. Furthermore, this information can include information about components that are not themselves directly monitored by instrumentation agents 60 associated with the testing system, such as database 30(1) and database 30(2) of FIG. 1.

The information displayed by test module 10 can include information identifying the response times and response data generated by each component as well as exceptions, logged events, and other data generated accompanying a particular transaction or transaction fragment. This can allow a user to conveniently track progress and/or organization of particular transactions as well as pinpoint errors or identify where performance bottlenecks are arising.

As an example of how such an instrumentation broker and one or more instrumentation agents can be used to provide visibility into a service oriented architecture (SOA), consider an example situation in which the test module is configured to execute a test case, which includes a web service call, every ten minutes. In this example, calling the web service can result in three EJBs being called, and one of those EJBs can in turn issue several SQL statements. If the service begins to fail, a user can view the information representing the characteristics of the most recent test case execution provided by the test module (which in turn received the information from instrumentation agents monitoring the EJBs). This information can indicate that one of the expected SQL statements is not being issued (e.g., one of the instrumentation agents can generate characteristics information identifying which SQL statements were issued, and this information fails to identify one of the expected SQL statements). Accordingly, the user can quickly identify why the web service is failing, without having to independently test each of the EJBs called by that web service.

In some embodiments, instrumentation agents 60 can be selectively enabled and disabled. For example, the instrumentation modules 60 can support an isEnabled( ) function will return true unless an administrator has explicitly disabled the instrumentation module (e.g., by setting a system property accessed by isEnabled( ) to a value indicating that testing is currently disabled).

Similarly, in some embodiments, each instrumentation agent 60 can be configured to determine whether a particular request and/or response is part of a test case being executed by test module 10 and selectively generate frames based upon whether a test case is currently being executed. For example, instrumentation modules can do this by searching requests and/or responses for special hypertext transfer protocol (HTTP) headers or SOAP headers. In some embodiments, instrumentation modules can perform this search using a hash table lookup. If the request and/or response is part of a test case, an instrumentation agent 60 can then capture characteristics associated with the request and/or response and cause information identifying those characteristics to be returned to instrumentation broker 70. Otherwise, such information may not be returned to instrumentation broker 70.

While instrumentation agents can be selectively enabled and/or configured to selectively capture information for test module 10 in some embodiments, other embodiments may not support one or both of these features. For example, some embodiments may support selectively enabling instrumentation agents but may not support selectively capturing and returning information (i.e., such systems may capture and return information for all requests and/or responses, whether or not those requests and/or responses are part of a test case, so long as the instrumentation agents are enabled). Similarly, some embodiments may support selective capture of information, but may not support selective enablement of instrumentation agents. Yet other embodiments may not support either feature.

Figure 2:
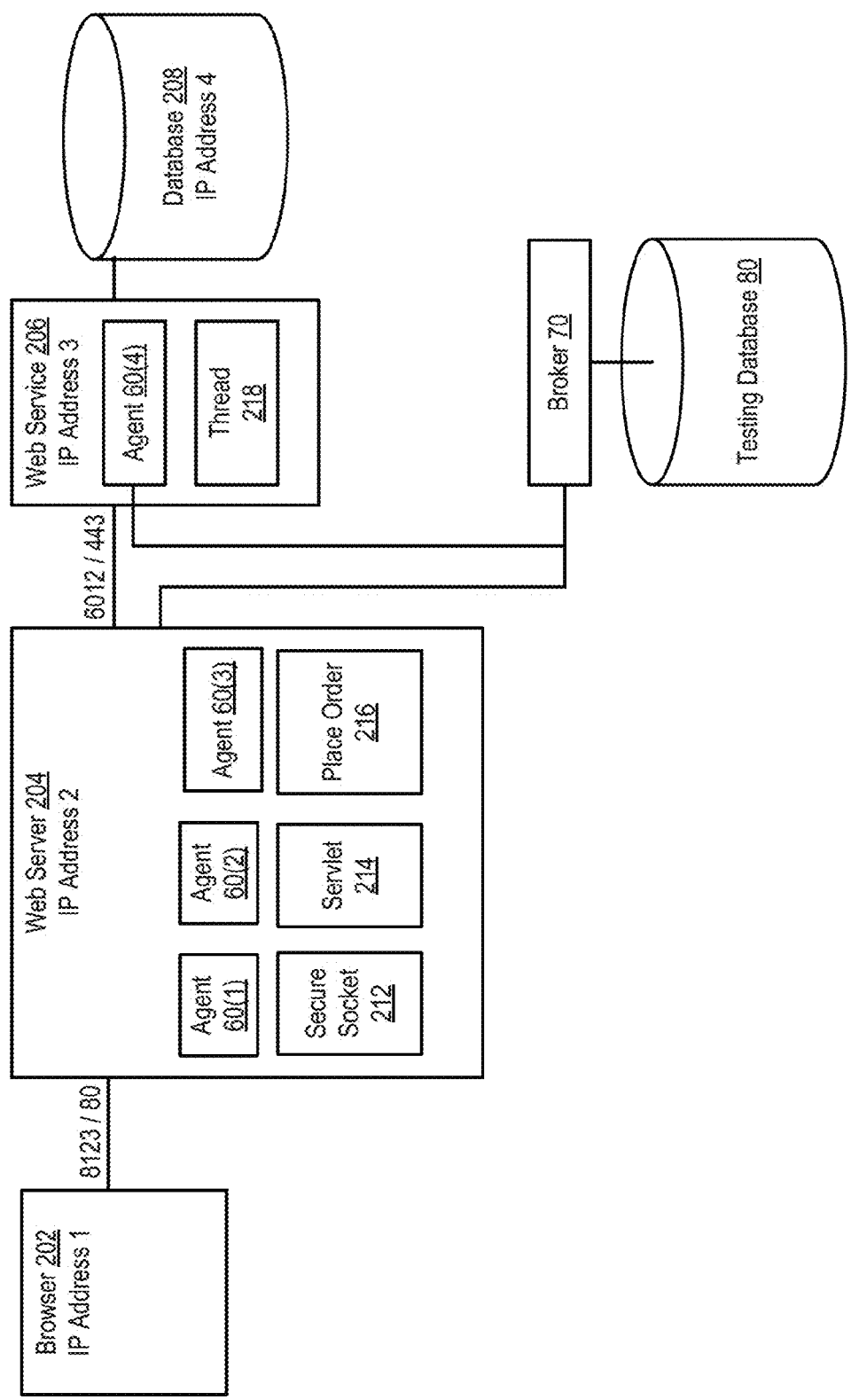
FIG. 2 is a block diagram of another system under test.

FIG. 2 shows another example of a system under test that includes instrumentation agents 60 (which are similar to the similarly-numbered instrumentation agents of FIG. 1), which are configured to send frames to an instrumentation broker 70 that organizes the received frames for storage in testing database 80. In this example, the system under test includes a browser 202, a web server 204, a web service 206, and a database 208. Web server 204 includes several sub-components, including secure socket module 212, servlet 214, and place order module 216.

Each component is assigned at least one IP address. For instance, for simplicity in this particular illustrative example, Browser 202 can be assigned IP Address 1. Web server 204 can be assigned IP Address 2. Web service 206 can be assigned IP Address 3. Database 208 can be assigned IP Address 4.

Some components are directly monitored by an instrumentation agent, including web service 206, which includes an instrumentation agent 60(4) monitoring a thread of execution 218, and web server 204, which includes a separate instrumentation agent for each sub-component. Instrumentation agent 60(1) monitors secure socket module 212, instrumentation agent 60(2) monitors servlet 214, and instrumentation agent 60(3) monitors place order module 216.

A transaction begins, in this particular example, when browser 202 sends a request from port 8123 to port 80 of web server 204. No instrumentation agent monitors browser 202, and thus no frame corresponding to this activity in browser 202 can be sent to instrumentation broker 70.

Secure socket module 212 receives the request via port 80. This activity is detected by instrumentation agent 60(1), which begins temporarily storing information identifying the characteristics of the request, including the port and IP address from which the request was sent (port 8123 and IP Address 1), the port via which the request was received (port 80 and IP Address 2), the time at which the request was received, the data included in the request, the amount of data included in the request, and the like. In response to processing the request, secure socket module 212 can send a request to (e.g., by calling) servlet 214. Instrumentation agent 60(1) can detect and store the characteristics of this request as well, including information identifying the requester, secure socket module 212, and the responder, servlet 214.

Instrumentation agent 60(2) detects the request sent to servlet 214 and similarly begins temporarily storing characteristics associated with this request. Servlet 214 processes the request received from secure socket module 212 and sends a corresponding request to place order module 216. Instrumentation agent 60(2) can detect and store the characteristics of this request as well.

Instrumentation agent 60(3) detects the request sent to place order module 216 and begins storing information associated with this request. In order to get information in order to respond to the request, place order module 216 sends a request to web service 206 via port 6012. Instrumentation agent 60(3) can also store characteristics of this request, including the port and IP address from which the request was sent (port 6012 and IP Address 2) and the port and IP address to which the request was sent (port 445 and IP Address 4).

Similarly, instrumentation agent 60(4) detects the reception of the request by thread 218 of web service 206 and begins storing information corresponding to the request. Thread 218 sends a request to access database 208 in response to the request. Instrumentation agent 60(4) also stores information associated with this request, including the IP address (IP Address 3) from which the request was sent and the IP address (IP Address 4) to which the request was sent.

In response to the request from thread 218, database 208 performs the requested database access and sends a response to thread 218. Instrumentation agent 60(4) detects this response and stores information associated with the response, including the time at which it was received and appropriate IP address information. Thread 218 then generates a response to place order module 216. Instrumentation agent 60(4) detects this response and stores the associated characteristics. Instrumentation agent 60(4) then inserts all of the saved characteristic information into a frame and sends the frame to instrumentation broker 70.

Instrumentation agent 60(3) detects the response received by place order module 216 from web service 206 and saves information corresponding to that response. Place order module 216 processes the response and then generates a response to servlet 214. Instrumentation agent 60(3) detects and stores characteristics of this response, and then inserts all of the saved characteristics (including that associated with the request received from servlet 214, the response sent to servlet 214, the request sent to web service 206, and the response received from web service 206) into a frame. Instrumentation agent 60(3) then sends the frame to instrumentation broker 70.

Instrumentation agent 60(2) detects the response received by servlet 214 from place order module 216 and saves corresponding characteristic information. Servlet 214 processes the response received from place order module 216 in order to generate a response to secure socket module 212. Instrumentation agent 60(2) also save the characteristics of that response, and then sends a frame containing all of the saved information to instrumentation broker 70.

Instrumentation agent 60(1) detects the response sent from servlet 214 to secure socket module 212 and stores characteristics of that response. Secure socket module 212 processes the response to generate a response to browser 202. Instrumentation agent 60(1) also stores characteristics of this response. Instrumentation agent 60(1) then generates a frame containing all of the stored characteristics and sends the frame to instrumentation broker 70.

In one particular example, instrumentation broker 70 can order the frames received from instrumentation agents 60(1)-60(4), for instance, according to timing information within the frames. Other techniques can be used to group and order frames received from instrumentation agents 60(1)-60(4), including the techniques that do not (at least directly) utilize or collect timing information in connection with particular requests/responses or other inter-component communications. For instance, instrumentation broker 70 can use other component-identifying information such as IP addresses, ports and the like, as well as data sizes, amount of data, and the like to group, correlate, and order frames within particular transactions. Further, instrumentation broker 70 can correlate requests and responses identified in different frames using component-identifying information such as IP addresses, ports and the like, as well as data sizes, to correlate requests and responses identified in different frames with each other. For example, the frame received from instrumentation agent 60(1) can identify the same request (the request sent by secure socket module 212) as the frame received from instrumentation agent 60(2). Based upon this, instrumentation broker 70 determines that the frame received from instrumentation agent 60(1) is the parent frame of the frame received from instrumentation agent 60(1).

Instrumentation broker 70 can also detect a potential need for and generate several synthetic frames for a particular transaction. For example, the frame received from instrumentation agent 60(1) indicates that a request was received from browser 202. Instrumentation broker 70 can identify that browser 202 is not instrumented with an instrumentation agent. Accordingly, instrumentation broker 70 can create a synthetic frame that is the parent frame of the frame received from instrumentation agent 60(1) and that corresponds to the activity in browser 202 to send the initial request to web server 204 and receive the corresponding response from web server 204. Similarly, instrumentation broker 70 can create a synthetic frame to correspond to the activity in database 208.

Figure 3A:
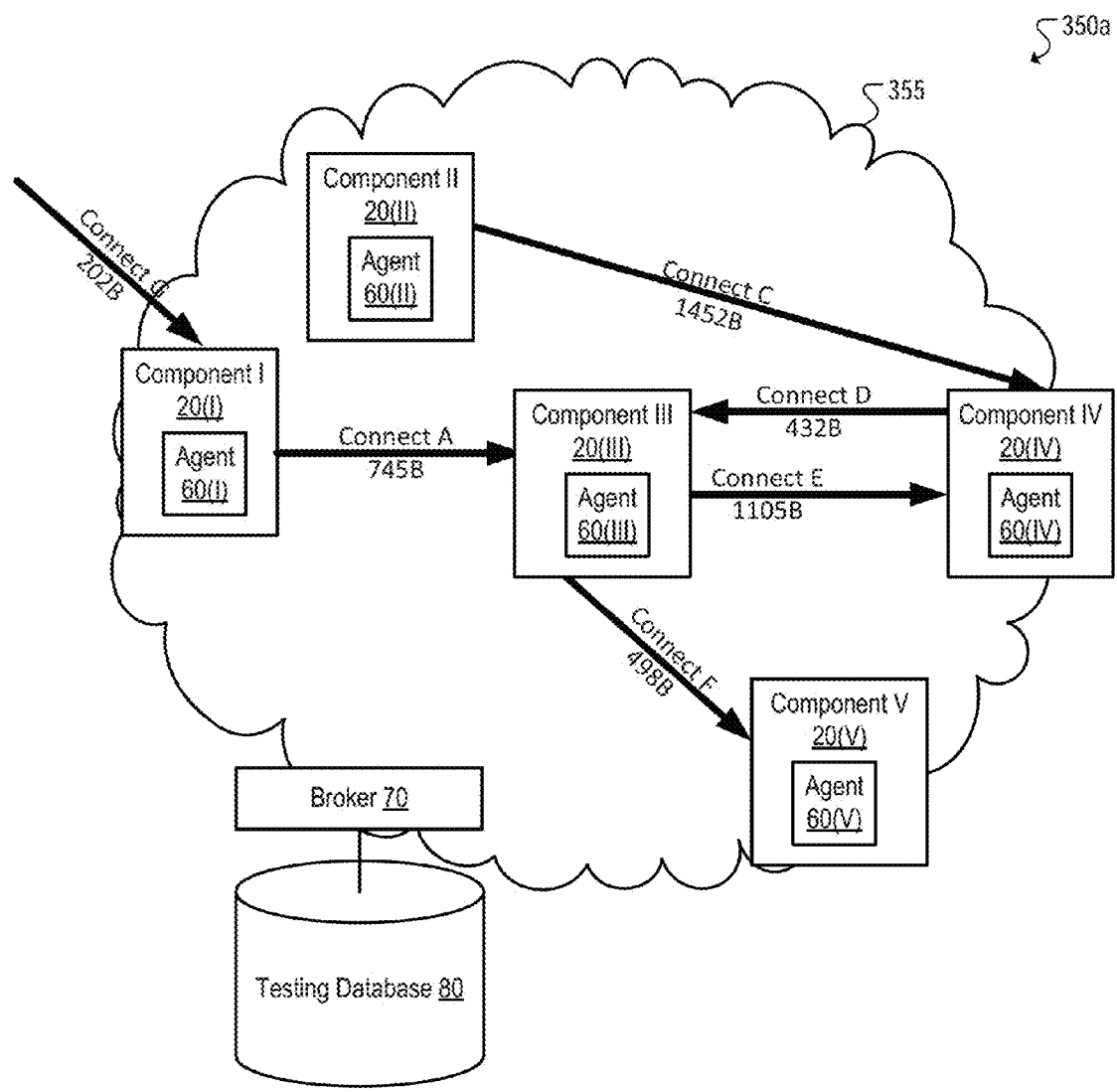
FIGS. 3A-3C are block diagrams illustrating example interactions in an example system for generating information for use in modeling and testing.
Figure 3B:
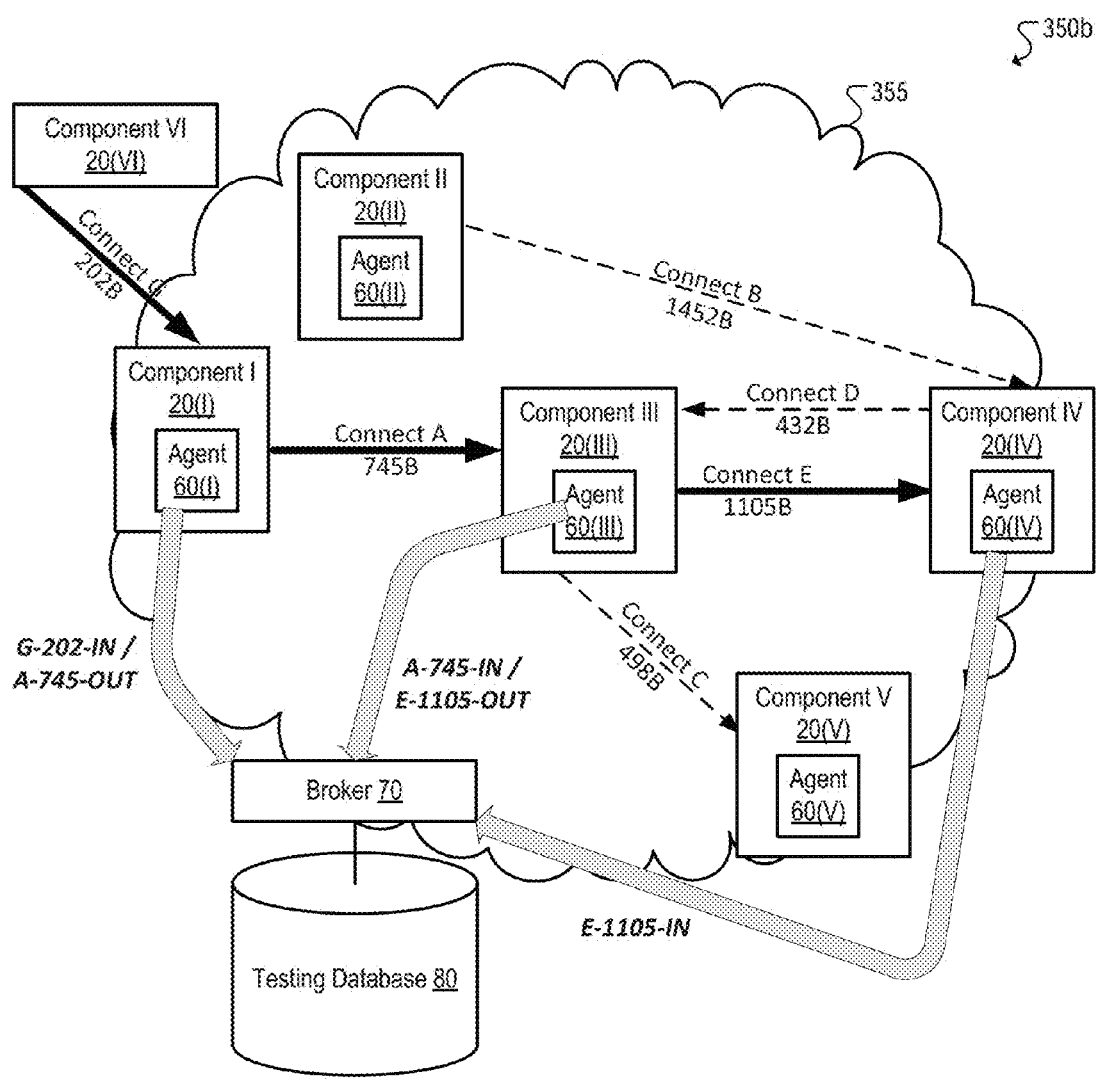
Figure 3C:
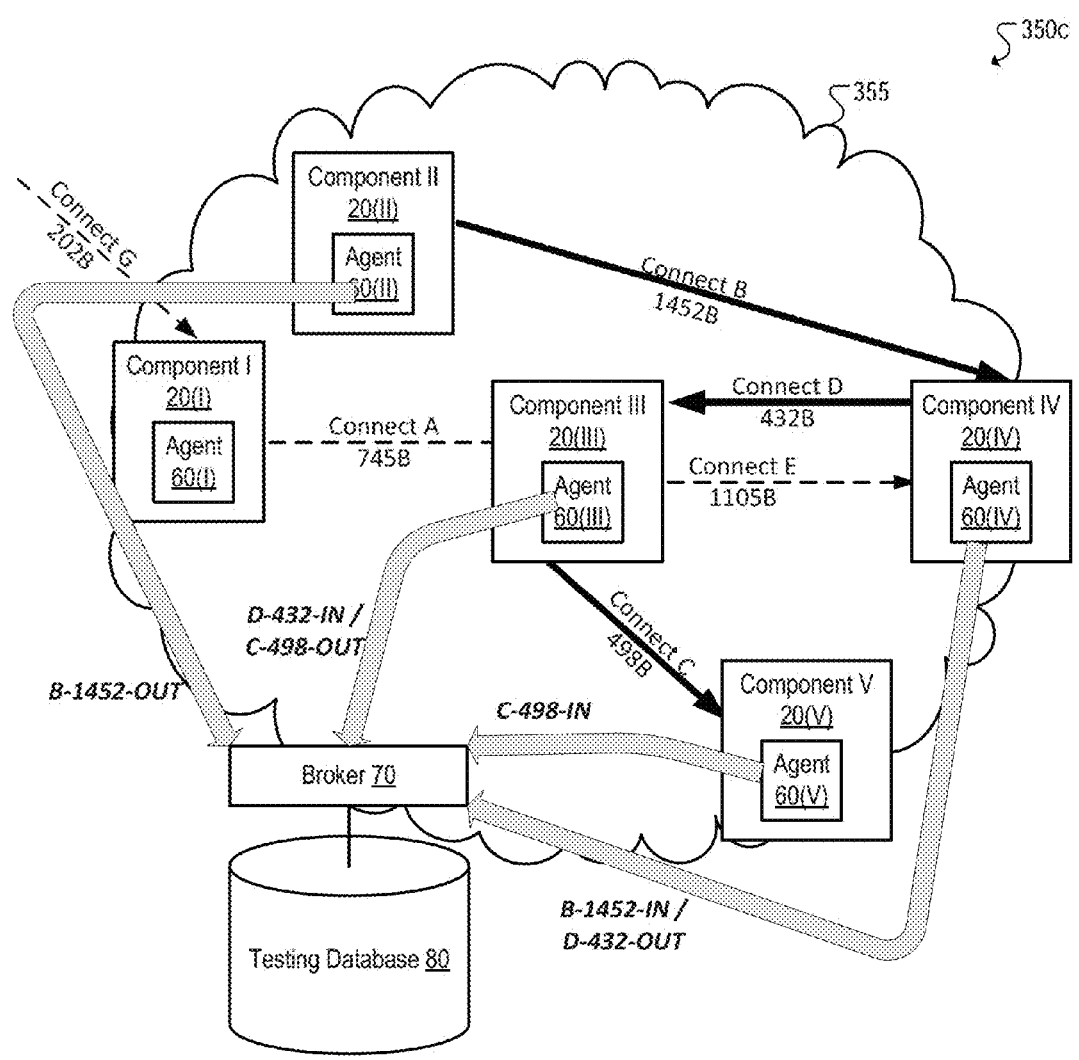

FIGS. 3A-3C are block diagrams 350a-c illustrating example interactions in an example system for generating information for use in modeling and testing. For instance, in FIG. 3A, a plurality of software components 20(I)-20(V) can be provided, one or more of which include a respective instrumentation agent (e.g., 60(I)-60(V)) monitoring and collecting data corresponding to any number of events, operations, calls, threads, software processes, network connections, etc. relating to transactions engaged in by the software component. Indeed, in the examples of FIGS. 3A-3C a plurality of communications are made between software components 20(I)-20(V) over a plurality of network connections (e.g., Connections A-G) in one or more networks 355. Agents 60(I)-60(V) can monitor and collect data describing characteristics of the components' (e.g., 20(I)-20(V)) participation in any number of different network connections. Agents 60(I)-60(V) can package such data in frames and provide the frames to instrumentation broker 70 for use in identifying transactions and fragments of transactions involving the connections between the components 20(I)-20(V). Data collected and included in frames describing components' involvement in various transaction can be used, as noted above, by the instrumentation broker 70 to group communications between components and identify transaction fragments from the communications. Further, different transaction fragments identified from the connection data included in the generated frames can be used to group transaction fragments and determine that particular transaction fragments are included in one or more common transactions. Further, such frames can also be used by an instrumentation broker 70 to identify a flowpath of the transaction between components corresponding to identified transaction fragments.

Turning to FIG. 3B, a first transaction is shown from the network connections during a given period including multiple transaction fragments involving Connections G, A, and E (represented as bolded arrows in FIG. 3B). Other connections can also be live during the transactions (e.g., Connections B, C, D, F, etc.) and correspond to other transactions active in the system. The connections themselves, in some instances, may provide no explicit indication that they pertain to a single transaction. Indeed, in the abstract, it may not be possible for a passive listening device or observer to identify that one or more of the Connections A-G are involved in any common transactions. In the example of FIG. 3B, agents (60(I), 60(III), 60(IV)) of components (e.g., 20(I), 20(III), 20(IV), etc.) involved in the transaction can be monitoring network connections of the components. Such monitoring can include the monitoring of IP addresses and ports used by the components in the connections, the type of connection (e.g., TCP, IPX, PPP, and connections applying other point-to-point communication protocols, protocols conforming to RFC 1547, and others), whether the component is reading/listening/receiving or writing/sending within the connection, as well as the amount of data transmitted (or received) over the connection.

As an example, Connection A can include outbound data (or a request) from Component I (20(I)) to Component III (20(III)), and the amount data can be, in this particular example, 745 bytes (as shown in FIGS. 3A-3C). The agent 60(I) of Component I (20(I) can identify the connection (e.g., by noting the port and IP address used by Component I in the connection) and count the amount of data transmitted over the connection. Agents 60(I) can also identify that the data is outbound relative to Component I in Connection A. Such information can be packaged and sent as a frame to instrumentation broker 70. Further, the agent 60(III) of the other component (20(III)) participating in Connection A can also be monitoring Component III's corresponding participation in the connection, collecting similar data including the port and IP address used by Component III, the amount of data received by Component III over the connection together with whether the data was inbound or outbound relative to Component III. Likewise, agent 60(III) can package such collected data in a frame sent to instrumentation broker 70. Other information can be included in, linked to, or otherwise associated with data included in frames sent to the broker 70 in connection with a component's participation in a connection, including data describing other connections triggered in connection with the data sent/received by the component over the first connection. Additional data can also be included in each of the two sent frames, such as the IP address and/or port of the other component in the connection (e.g., the IP address and/or port of Component III in the frame sent by Component I's agent 60(I)).

Continuing with the example of FIG. 3B, instrumentation broker 70 can receive frames from agents 60(I) and 60(III) corresponding to Connection A. Instrumentation broker 70 can identify from the frames a particular connection. In some instances, instrumentation broker 70 can monitor a plurality of live connections in a system and match IP address, port, and other identifiers included in the frames to particular monitored live connections. Indeed, in such examples, upon first identifying a particular component's participation in a network connection, corresponding agents at the participating components can send preliminary frames to the instrumentation broker 70 alerting the broker of the connection and the participants in the connection. Further, instrumentation broker 70 can identify from the frames from agents 60(I) and 60(III) that a substantially identical amount of data is reported as being exchanged using the respective agent's component. For instance, in this example, each of the frames from agents 60(I) and 60(III) can be interpreted by instrumentation broker 70 to identify that 745 bytes was exchanged in a connection involving Component I and a connection involving Component III. Based at least in part on the identification of a substantially identical amount of data identified in two frames, instrumentation broker 70 can conclude that Components I and III were participating in the same connection (e.g., Connection A). Further, instrumentation broker 70 can further determine the direction of data flow within the connection (e.g., that the 745 bytes were sent by (i.e., outbound to) Component I and received by (i.e., inbound to) Component III over the particular common connection. Instrumentation broker 70 can additionally identify, predict, or otherwise determine a particular transaction fragment involving the exchange of data from Component I to Component III.

Continuing the example of FIG. 3B, each of agents 60(I) and 60(III) can also collect data of other connections involving their respective components (e.g., 20(I) and 20(III)). For instance, in the example of FIG. 3B, Component I participates in both Connections A and G and Component III participates in Connections A and E (as well as Connections C and D, to be discussed in connection with examples of FIG. 3C). Similar data can be collected by the agents relating to the other connections, including the amount of data counted as being sent or received over the connection. Additionally, agents (e.g., 60(I), 60(III)) can further identify relationships between connections participated in by its corresponding component. For instance, the receipt of 202 bytes over Connection G by Component I can trigger, for instance, a method call and thread that initiate network Connection A and communication between Components I and III. Agent 60(I) can observe the relationship between connections participated in by the component, whether they be causal, parental, hierarchical, unrelated, or otherwise. In connection with determining an association between two or more connections engaged in by a particular components, an agent can identify and communicate such associations in frames or other data sent to the instrumentation broker 70 describing the connections. Indeed, in some instances, an agent can send data concerning the plurality of associated connections in a single frame, thereby identifying the connections' relation. As an example, in the example of FIG. 3B, agent 60(I) could bundle data collected regarding Component I's involvement in Connection G (e.g., inbound 202 bytes) with data collected regarding Component I's involvement in Connection A (e.g., outbound 745 bytes) to indicate that Connection G and Connection A relate to Component I's participation within a single transaction.

Instrumentation broker 70 can determine from frames identifying associations between connections participated in by a single component that the identified associated connections relate to a common transaction. Indeed, such associations identified by the agents (e.g., 60(I)-60(V)) can serve to stitch identified transaction fragments together. For instance, in the example of FIG. 3B, instrumentation broker 70 can independently identify Connections G, A, and E from frames sent from each of agents 60(I), 60(III), and 60(IV). However, to identify an association between the identified connections, and corresponding transaction fragment determined by the broker 70 from the received frames, associations between Connections G and A (e.g., identified by agent 60(I)) and associations between Connections A and E (e.g., by agent 60(III)), as well as identifications of whether data over the connections was inbound or outbound relative to the agent's component, can be used to stitch transaction fragments together corresponding to Connections G, A, and E. Indeed, using frame data received from agents 60(I), 60(III), and 60(IV), instrumentation broker 70 can first identify individual transaction fragments involving Components I, III, and IV, that identified fragments are parts of the same transaction, as well as a flow of the fragments within the transaction relative to the other related fragments. For instance, by identifying that Connection G was inbound relative to Component I and that related Connection A was outbound relative to the Component I, it can be determined that the transaction flowed from Component VI through Component I to Component III via Connections G and A, respectively. Consequently, in this example, instrumentation broker 70 can identify that a transaction fragment involving Component I, fielding a request of another component (e.g., Component VI) initiated a transaction that next involved the sending of data from Component I to Component III over Connection A, and then the sending of data from Component III to Component IV over Connection E, as well as potentially other transaction fragments included within the same transaction.

In addition to being able to use connection associations to predict or determine a stitching or flowpath of transaction fragments, instrumentation broker 70, in some instances can use the lack of association data reported by an agent to determine a root or leaf (e.g., beginning or end) of a particular transaction. For instance, in the example of FIG. 3B, instrumentation broker 70 can identify that no related connections (or other transaction fragments) involving Component IV were reported and conclude, predictively, that the lack of further connections or other reporting data from Component IV identifying or alluding to a relationship to Connection E indicates that the transaction terminated at Component IV (e.g, because no related outbound connections were reported by agent 60(IV)). Similarly, root nodes can be predictively determined based on the absence of frames documenting an inbound connection at a particular component from which other transaction fragments (and related connections) originate.

As noted in the example of FIG. 3B, in some instances, components involved in connections or transaction fragments may not be equipped with an agent, as in the example of Component VI (20(V)). Some data may be able to be gleaned regarding the semi-anonymous component (e.g., 20(VI)) and sent to and used by instrumentation broker 70, such as IP address, port number, and other identifying data gleaned from agents (e.g., 60(I)) of other components (e.g., Component I) interacting with the component (e.g., Component VI). Indeed, in some instances, one or more synthetic frames can be generated for such a component (e.g., Component VI).

Turning to FIG. 3C, a block diagram 350c is shown illustrating that other transactions and related connections can be active during transactions and connections monitored by agents 60(I)-60(V) in the system. Indeed, a single agent can be monitoring multiple connections at a single component concurrently, including connections relating to distinct transactions involving the agent's respective software component. For instance, in FIG. 3C, connections involved in a second transaction are shown (as bolded arrows), including Connections B, D, and C. The connections can correspond to transaction fragments and transaction flow from Component II to Component IV to Component III to Component V.

Despite Components III and IV being involved in both of the distinct transactions described in the examples of FIGS. 3B and 3C, instrumentation broker 70 can distinguish the components' (e.g., 20(III), 20(IV)) respective involvement in multiple distinct transactions. For instance, instrumentation broker 70 can identify associations between Connections C and D through frames sent by agent 60(III) as well as associations between Connections A and E through the frames sent by agent 60(III). Further, instrumentation broker 70 can identify that no associations have been claimed between, for instance Connections A and C, or Connections D and E, or other connections and transaction fragments identified by instrumentation broker, to determine that transactions are distinct. Further, as noted above, instrumentation broker 70 can identify roots and leafs of a particular transaction, thus, potentially closing-off an identified transaction (or transaction branch) from additional, associated transaction fragments identified or determined by the instrumentation broker 70.

Turning now to FIGS. 4A-4B, table diagrams 450a-b representing example data collected by instrumentation agents that can be used by an example instrumentation broker 70. Table diagrams 450a-b can reflect the tracking of data for a plurality of connections monitored by agents, including the connections illustrated in the examples of FIGS. 3A-3C. For instance, data communicated to the instrumentation broker 70 in frames generated by agents monitoring connections of corresponding software components can be monitored, stored, cached, recorded, or otherwise maintained by the instrumentation broker 70 while the instrumentation broker 70 attempts to define transaction fragments and transaction fragment groupings (i.e., transaction fragments included in a common transaction) from the received frame data.

Further, frames received from various agents operating in a test system can arrive at the instrumentation broker 70 asynchronously and out of order, depending, for instance, on the respective performance, monitoring, connections, etc. of a particular agent or component. For example, as shown in the table diagrams 450a-b of FIGS. 4A-4B, a data record is represented of data collected from agents at the instrumentation broker (e.g., 70) at time t=x (FIG. 4A) and a subsequent time t=x+1 (FIG. 4B). In the particular examples of FIGS. 4A-4B, an instrumentation broker may receive data from agents monitoring various components in a system alerting the instrumentation broker of various connections monitored by the agents. For example, as shown in FIG. 4A, data can be received from one or more agents for components participating in a given connection, the data providing such information as an identification of the agent providing the information, a port number and/or IP address used by the respective component within the connection, and an indication of whether the connection is currently live. Identifying live or initiating network connections monitored by agents communicating with the instrumentation broker can allow the instrumentation broker, for example, to track what frames have been received for particular connections as well as whether the broker should be expecting additional frames relating to a connection.

As an example, in the table 450a, in a row 460a corresponding to a Connection D, at a first time t=x, a frame has been received for the identified Connection D from an agent "IV," the agent reporting that 1122 bytes of outbound data were observed by the agent at a particular software component (e.g., Component IV). The other agent, agent "III," previously identified as monitoring the connection (e.g., at the initiation of the network connection "D") may not yet have generated or sent a frame forwarding connection information observed by the agent. Because the instrumentation broker received an indication that both agents III and IV would be monitoring Connection C, however, instrumentation broker 70 can wait for (and in some cases send requests for) the frame generated by agent III before processing other frames, for instance, to generate a transaction fragment identifier corresponding to the data exchanged over Connection C. Accordingly, as shown in FIG. 4B, after some time has past (e.g., at time t=x+1) a frame from agent "III" for Connection C can be received and recorded (e.g., at row 460b). Further, using techniques similar to those described elsewhere herein, instrumentation broker 70 can identify that the frame from agent "III" also identifies that the frame pertains to the same connection, for instance, sharing consistent port and IP address information for the component monitored by agent "III," as well as an indication that the same amount of data (1122 bytes) has been observed by agent "III." Based at least in part on the observed substantially-matching data amounts in the frames received by agents III and IV, the instrumentation broker can conclude that the agents were each watching a separate end of the same connection and participating in a common transaction fragment. Accordingly, instrumentation broker 70 can generate a corresponding transaction fragment identifier based on the substantially-matching data amounts in the frames received by agents III and IV involving Connection C. Similarly, received matching amount data in each of Connections A-G can be used by the instrumentation broker 70 as the basis for identifying corresponding transaction fragments involving the components monitored by the respective agents.

Agents can generate frames for observed network connections so as to identify the components involved in the connection (e.g., sender port, sender IP address, recipient port, recipient IP address, component ID, agent ID, etc.) as well as the amount of data observed over the connection by the agent, including whether the data was observed as outbound or inbound. In such instances, a frame can be generated that can be interpreted by the instrumentation broker to identify the amount of data value determined by the agent. In some instances, this can involve including the data amount value explicitly in the frame, concatenating the amount value with other values corresponding to the monitored connection (such as IP address or port number), or obfuscating the amount value, for instance, by hashing either the value, a concatenated string including the amount value, an array including the amount value, etc. among many other potential implementations and examples.

Amount data can be particularly valuable, in some implementations, where two components are engaged in several parallel transactions and are reusing the same IP address, ports, etc. For instance, amount data can assist in differentiating between two connections with substantially identical connection identification data (e.g., sender port, sender IP address, recipient port, recipient IP address, component ID, agent ID, etc.) can be differentiated based on the respective amounts of data observed over the connections, including indications of whether the data was inbound or outbound, in some instances. Further, while in some cases a frame including a component's IP address, port number, and data amount value can, fairly reliably, be concluded to be locally unique, in some instances and systems the potential exists for more than one frame being received and processed by an instrumentation broker that includes the same or an otherwise overlapping combination of IP address, port number, and data amount values, leading to the possibility that the instrumentation broker confuses two received frames as being related to a common connection and/or transaction fragment. To avoid such situations, in some implementations, agents can generate a globally unique frame identifier or frame that can be differentiated from all other frames received by an instrumentation broker within a given time window yet still be read to identify the monitored data amount by the instrumentation broker.

Further, in some instances, frame data relating to connections monitored by agents in a system can be maintained for some limited period of time by the instrumentation broker (e.g., in connection with waiting for additional expected frames to arrive from corresponding agents involved in a connection). Given the possibility that particular transactions or connections will repeat or that other transactions will be generated that each have substantially identical connection descriptor data (e.g., IP addresses, port numbers, etc.) as well as data amounts, instrumentation broker can periodically delete received frame data, for instance, according to a data expiration schedule. For instance, it can be determined that, after a certain period of time, the likelihood of duplicate frame data being received is statistically more probable than an accepted threshold, causing the instrumentation broker to trigger deletion of maintained frame data older than a defined time threshold. For instance, in the particular example of FIGS. 4A-4B, data (470) for a Connection F is still maintained at the instrumentation broker at time t=x, (as shown in table 450a) even though Connection F is no longer active and expected frames (i.e., from agents II and III) have already been received. However, after a certain period of time, for instance, at t=x+1, as shown in updated table 450b, data pertaining to the old Connection F can be deleted to make room for the possible re-execution of a method or transaction that results in a duplicate version of data 470 being received by the instrumentation broker.

The instrumentation agent can extract the data amount value from the frame for use in identifying transaction fragments from received frames, as well as identifiers for the transaction fragments. Indeed, in some instances, instrumentation agent can generate a transaction fragment identifier that is globally unique, that uses or incorporates data included in an underlying frame reported by an agent, among other examples, in connection with building models and data that can be used to represent or visualize the transaction fragments or a transaction incorporating identified transaction fragments.

It should be appreciated that the tables in FIGS. 4A-4B are not necessarily representative of actual data structures or content used in real world implementations of the examples of FIGS. 3A-3C but are presented for purposes of illustrating certain concepts herein. Indeed, the examples of FIGS. 3A-4B and others are for illustrative purposes only and implementations of the principles described herein can adopt alternative structures, components, and functionality and still remain within the scope of this disclosure.

Figure 5A:
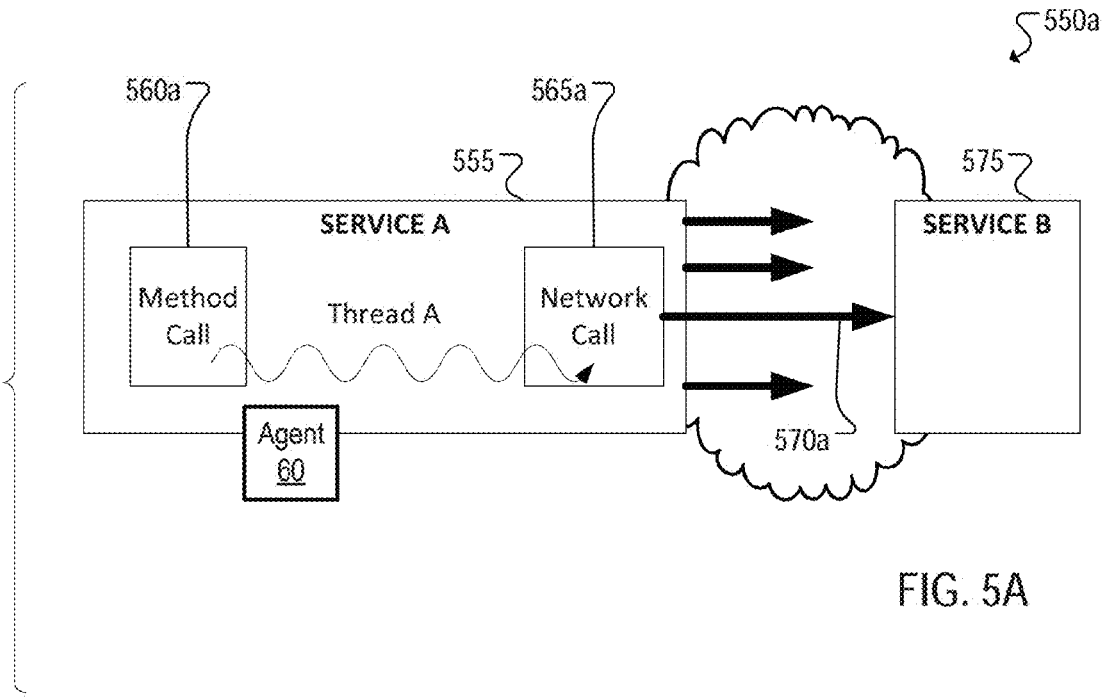
FIGS. 5A-5C are schematic diagrams illustrating threads included in one or more transactions in an example computing system.
Figure 5B:
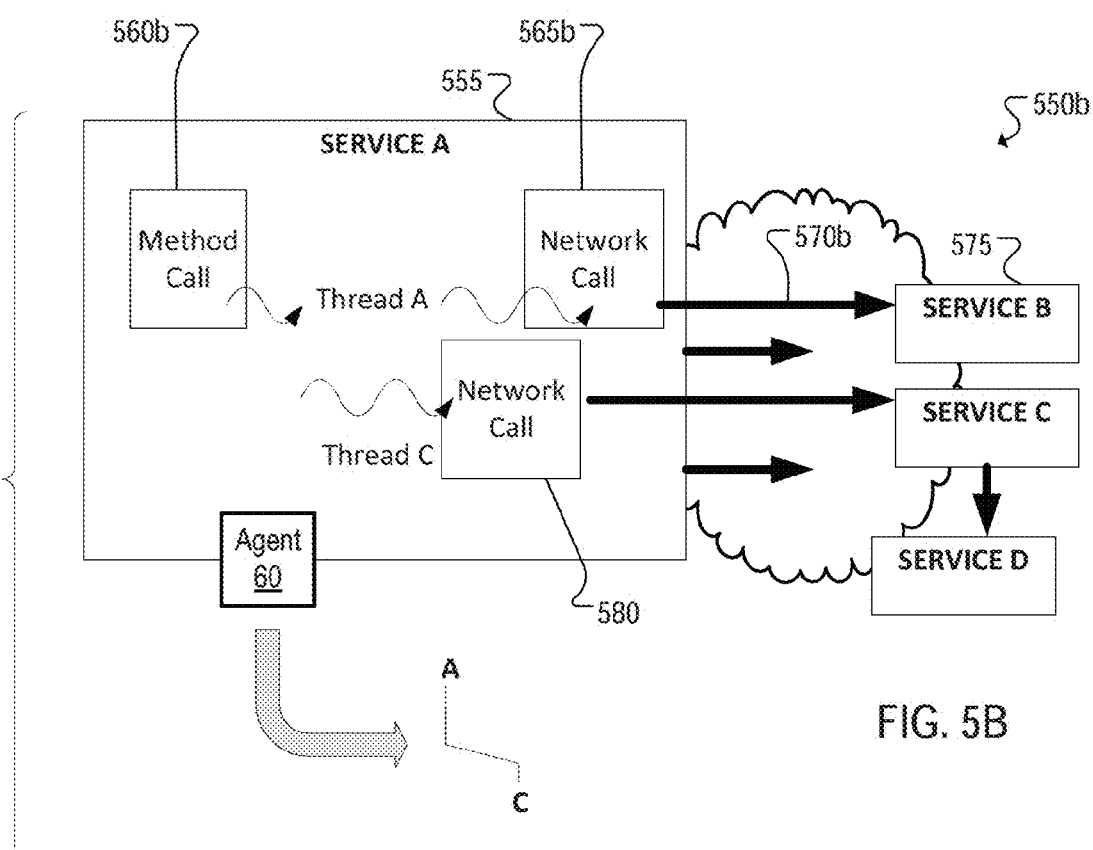
Figure 5C:
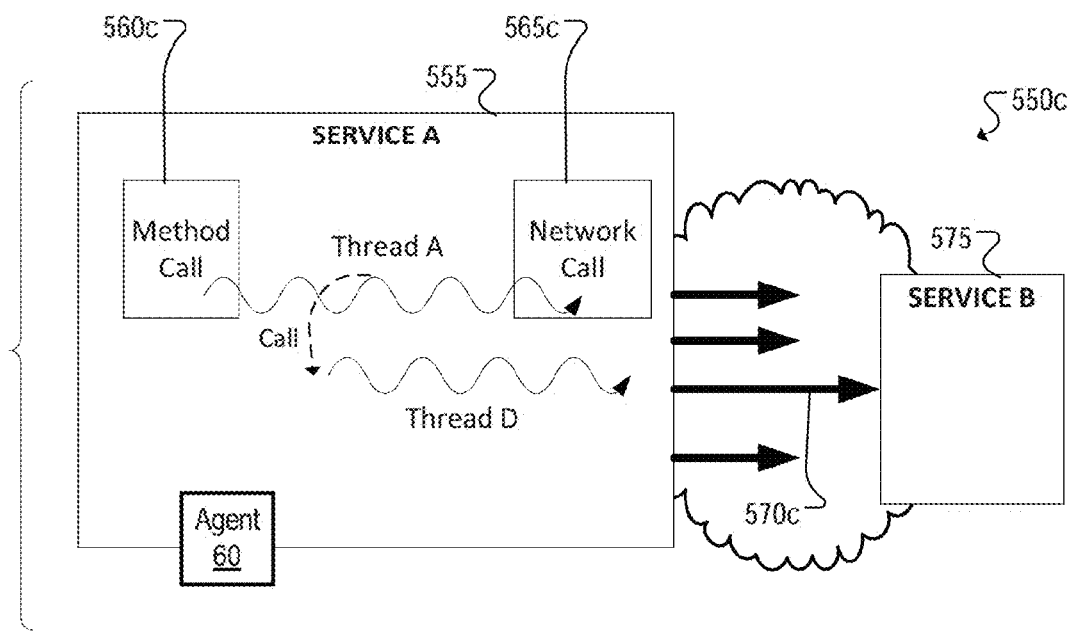

FIGS. 5A-5C are schematic diagrams 550a-c illustrating threads included in one or more transactions in an example computing system. In some instances, transaction fragments can include the execution of one or more software processes or methods at particular components. Such software processes can include one or more execution threads. Execution threads can be considered the smallest unit of processing that can be scheduled by an operating system and can be contained inside a software process. Threads can be monitored by instrumentation agents in some implementations and in connection with the monitoring of network connections and transaction fragments by agents.

For instance, in the example of FIG. 5A, a single component, Service A 555, can initiate a software process, call a method, etc. that causes one or more execution threads to be run at component 555. Further, component 555 can be engaged in multiple network connections as it operates. Some of these network connections can be determined to be relevant to testing or monitoring functionality provided by instrumentation agents (e.g., 60) and instrumentation brokers performing operations on data collected by instrumentation agents. In principle, agent 60 could monitor each and every network connection initiated and participated in by software component 555, however, in some implementations, it can be advantageous to limit the number of network connections monitored by the component's agent 60, for instance, to make more efficient use of computing resources and enhance performance of the system. Indeed, in some instances, an agent can be used to identify that a particular network connection relates to a particular operation, software process, method call, or transaction of interest. This can be accomplished, for instance, by identifying a thread (e.g., "Thread A") relevant to the particular method call (or process) 560a and further identifying whether a particular network call 565a is launched from the same thread as the thread involved in the method call 560a. In response to recognizing a network connection (e.g., 570a to communicate with component 575) launched from a thread monitored by the agent 60, the agent 60 can initiate monitoring of the resultant network connection, consistent with the principles detailed above.

Agents can monitor threads in components to generate transaction fragment identifiers for transaction fragments internal to the monitored component (i.e., intra-component transaction fragments), in addition to determining a subset of network connections for monitoring, such as described in the example of FIG. 5A. For instance, turning to FIG. 5B, a single thread, Thread A, within a method corresponding to method call 560b, can be run and itself call, and initiate, a second, child thread, Thread C. In this particular example, Thread A can await data returned from Thread C before completing and calling network connection 565b. As a result, transaction fragments downstream from the transaction fragment of Thread A can be at least partially dependent on Thread C. Further, Thread C can result in other network calls 580 being made involving component 555, including network connections involving outside software components other than the component (i.e., component 575) communicated with in network connection 565b by component 555. Indeed, Thread C can initiate a chain of transaction fragments involving components (e.g., "Service C" 585 and "Service D" 590) other than component 555. In short, child threads (e.g., Thread C) of a parent thread (e.g., Thread A) can themselves launch and/or embody one or more transaction fragments that can be monitored by the agent 60.

Additionally, agent 60 can identify that threads run in component 555 are children of other threads run in component 555. Based on the identification of such parent-child threads, an instrumentation agent 60 can identify not only other intra-component transaction fragments involving children threads, but also identify associations between the transaction fragments of a child thread and transaction fragments of its parent thread. For instance, agent 60 can generate a frame that defines one or more transaction fragments based on child thread (Thread C) and identify the parent-child relationship of Threads A and C. In that some child threads can involve connections with other software components (e.g., connections and transaction fragments involving "Service C" 585 and "Service D" 590), transaction fragments identified from these connections (e.g., by an instrumentation broker) can be grouped with transaction fragments stemming from related Thread A, allowing two "branches" of transaction fragments to be associated by virtue of an identified parent-child relationship between threads.

Turning to FIG. 5C, while in some instances a parent-child, or otherwise dependent relationship between threads can be identified and used in connection with the grouping of transaction fragments, not all child threads may be useful or relevant within the context of a parent thread's transaction. For instance, in the example of FIG. 5C, Thread A launches Thread D. However, Thread A does not wait (or perhaps even expect) data to be returned from Thread D. Indeed, in some instances, Thread D can be thought of a running at least partially independent of Thread A following launch. While Thread D can technically be defined as a child of Thread A, for purposes of stitching together transaction fragments, it may not be appropriate to associate transaction fragments involving or following Thread D with transaction fragments involving Thread A.

Further, it can be difficult to identify, ex ante, whether a child thread is truly related, or dependent on a parent thread. Indeed, in some implementations, an agent may lack familiarity with or the logic for recognizing the structure of a method call or software process and its composite execution threads, so as to not expect or monitor parent-child thread relationships. Accordingly, in some implementations, an agent can pre-calibrate tests and monitoring of particular software processes, methods, transactions, and the like in order to develop logic or familiarity with execution threading in the transactions. Indeed, it can be identified whether a child thread, for example, returns data to a parent thread, or whether a parent thread waits on results of or termination of a child thread before proceeding, so as to monitor the transition from a parent thread to a child thread and potentially identify associated transaction fragments involving the parent and child threads. During monitoring of a portion of a software transaction, and a thread included in the transaction, an agent can identify a child thread launched from a parent thread and generate a record noting that the parent thread is the parent to the child thread, as well as monitoring and collecting results and data exchanged between the threads. Such information, collected by the agent, can then be included in a generated frame sent to an instrumentation broker.

As noted above, an agent can monitor and collect data relating to transaction fragments involving network connection made by the agent's software component (i.e., inter-component transaction fragments) as well as intra-component transaction fragments involving interactions internal to the component, such as data exchanges between threads or the launching of a child thread from a parent thread. Accordingly, as illustrated in the block diagram 650 of FIG. 6, at least one instrumentation agent 60 can monitor a software component 655. In connection with the component's 655 involvement in a particular transaction, agent 60 can be used to monitor and collect data, in some cases concurrently, relating to inter- and intra-component transaction fragments. For instance, agent 60 can monitor a first network connection, Connection Y, to identify inbound data of an amount totaling 632 bytes. Agent 60 can generate a frame that includes data collected from the monitoring of Connection Y. Further, agent 60 can monitor another network connection, Connection Z, to identify outbound data of an amount totaling 745 bytes. Monitoring of network connections involving component 655 can also include the identification of network connection identification data, such as IP addresses and port numbers of components involved in the monitored network connections. Further, agent 60 can identify an association between two or more network connections participated in by the component based on the network connections' pertinence to a particular transaction, for instance based on execution thread monitoring by the agent 60.

Still further, and in connection with a component's involvement in a particular transaction or transaction fragments, agent 60 can additionally monitor processes and execution threads to identify and collect data relating to intra-component transaction fragments. For instance, agent 60 can monitor parent-child execution thread relationships between Threads A, B, and C to identify transaction fragments involving the execution threads as well as associations between the identified transaction fragments based on the execution thread relationships. Additionally, agent 60 can generate one or more frames to be sent to an instrumentation broker relating to both inter- and intra-component transaction fragments involving component 655. Indeed, agent 60 can identify associations between inter-component transaction fragments and intra-component transaction fragments and/or related inter-component transaction frames and related intra-component transaction frames. In some instances, associations between transaction fragments, monitored network connections, or frames generated by the agent 60 can be identified by the agent 60 and communicated to a instrumentation broker 70 for use by the instrumentation broker 70 in grouping transaction fragments into common transactions. In some instances, this can involve the agent packaging monitored data relating to distinct transaction fragments into a single frame, including monitored data relating to both inter- and intra-component transaction fragments.

Figure 6:
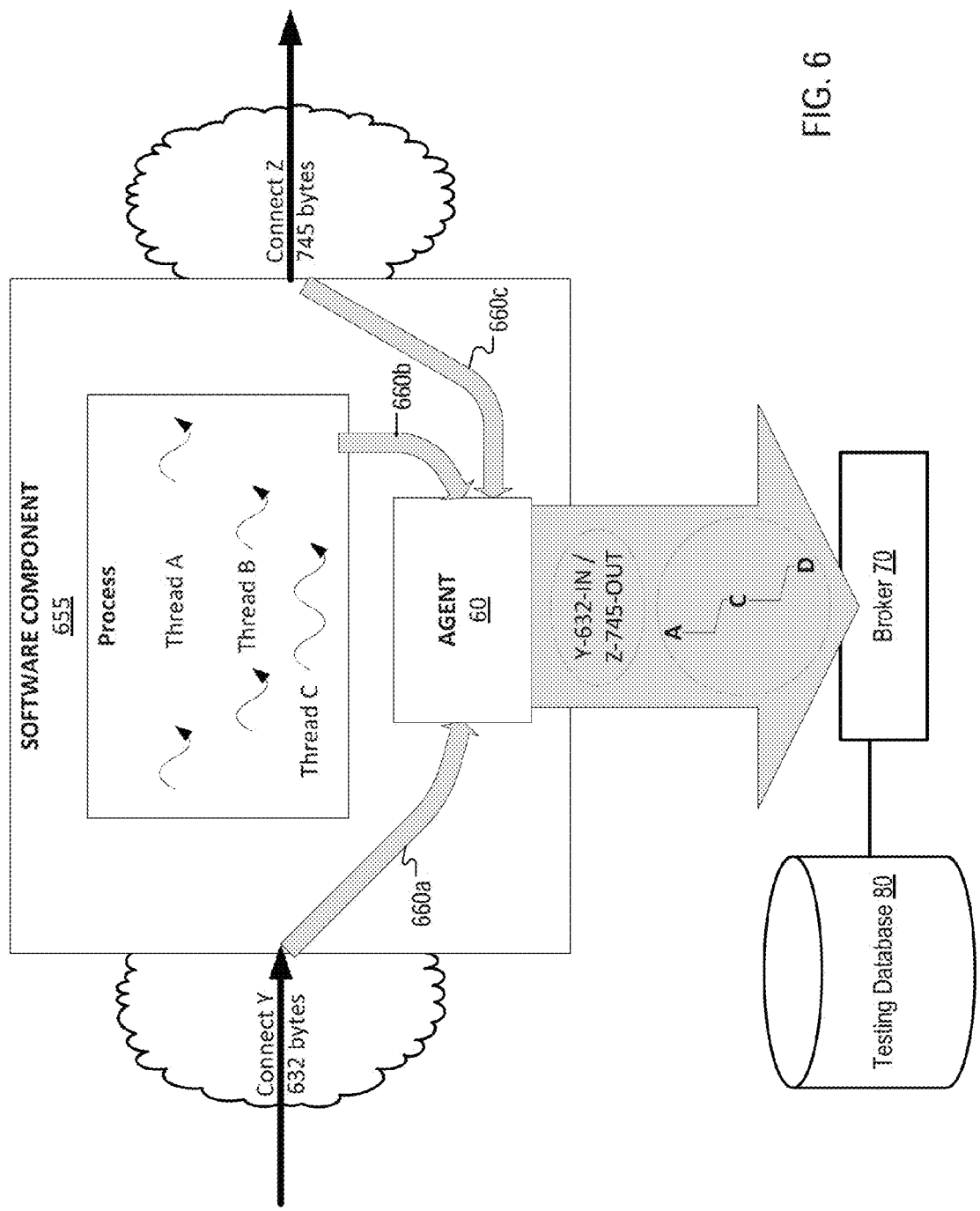
FIG. 6 is a block diagram illustrating collecting of transaction data by at least one instrumentation agent in an example computing system.

As shown in the example of FIG. 6, frame data 660*a-c* can be collected and sent by agent 60 relating to each of the monitoring of network connections, Connections Y and Z, as well as monitoring of execution threads, Threads A, B, and C, by agent 60. Frame data 660*a-c* can be packaged and sent to instrumentation broker 70 as a single frame or in multiple, distinct frames. In either instance, if agent 60 identifies that two or more of frame data 660*a-c* are associated with a common transaction, agent 60 can communicate the relationship of the two or more of frame data 660*a-c* to instrumentation broker 70 to assist instrumentation broker 70 in its stitching-together of transaction fragments identified as belonging to a single transaction, for instance, for use in a test system visualization model presented in a user interface, such as the example user interface represented in FIG. 12.

Figure 7:
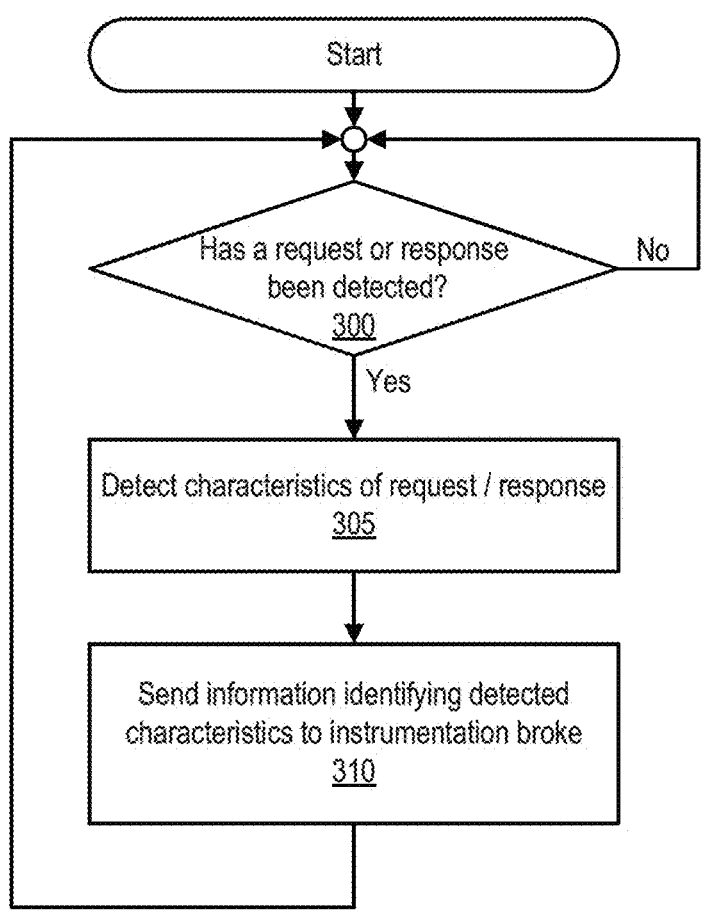
FIG. 7 is a flowchart of an example technique for generating information for use in modeling and testing that can be performed by an instrumentation agent.

FIG. 7 is a flowchart of an example technique for generating information for use in modeling and testing that can be performed, for example, by an instrumentation agent (e.g., one of instrumentation agents 60 of FIGS. 1, 2, 3A-3C, 6). As shown, the technique can include detecting a request or response, as shown at 300, detecting characteristics of that request or response, as shown at 305, and then sending the characteristics of that request or response to an instrumentation broker, as shown at 310. The characteristic information can be encrypted, compressed, or otherwise manipulated before being sent to the instrumentation broker.

Detecting a request or response can involve observing Java beans, detecting calls to a driver associated with an application being called, detecting HTTP requests, detecting messages in a queue, and the like. Detecting a request or response (or information being sent or received as part of a response or request) can also involve monitoring a socket or thread local storage.

Detecting characteristics can involve detecting an identity (e.g., in terms of a network address or other identifying information included in a request or response) of the component sending a request or response, detecting a system clock value or other time at which a request or response is received or sent, detecting contents and data volume of the request and/or response, detecting log and/or error messages, detecting system resource usage, detecting values generated by the component generating the request and/or response that are not actually included in the request and/or response, detecting the identity of a network connection or communication channel used in the request and/or response (such as TCP connections), and the like. Various types of characteristic information are described above. In some embodiments, the instrumentation agent can begin obtaining characteristic information in response to detecting receipt of a request, and can continue to obtain characteristic information to describe all activity in the monitored component until a response to the request is sent by the monitored component.

Figure 8:
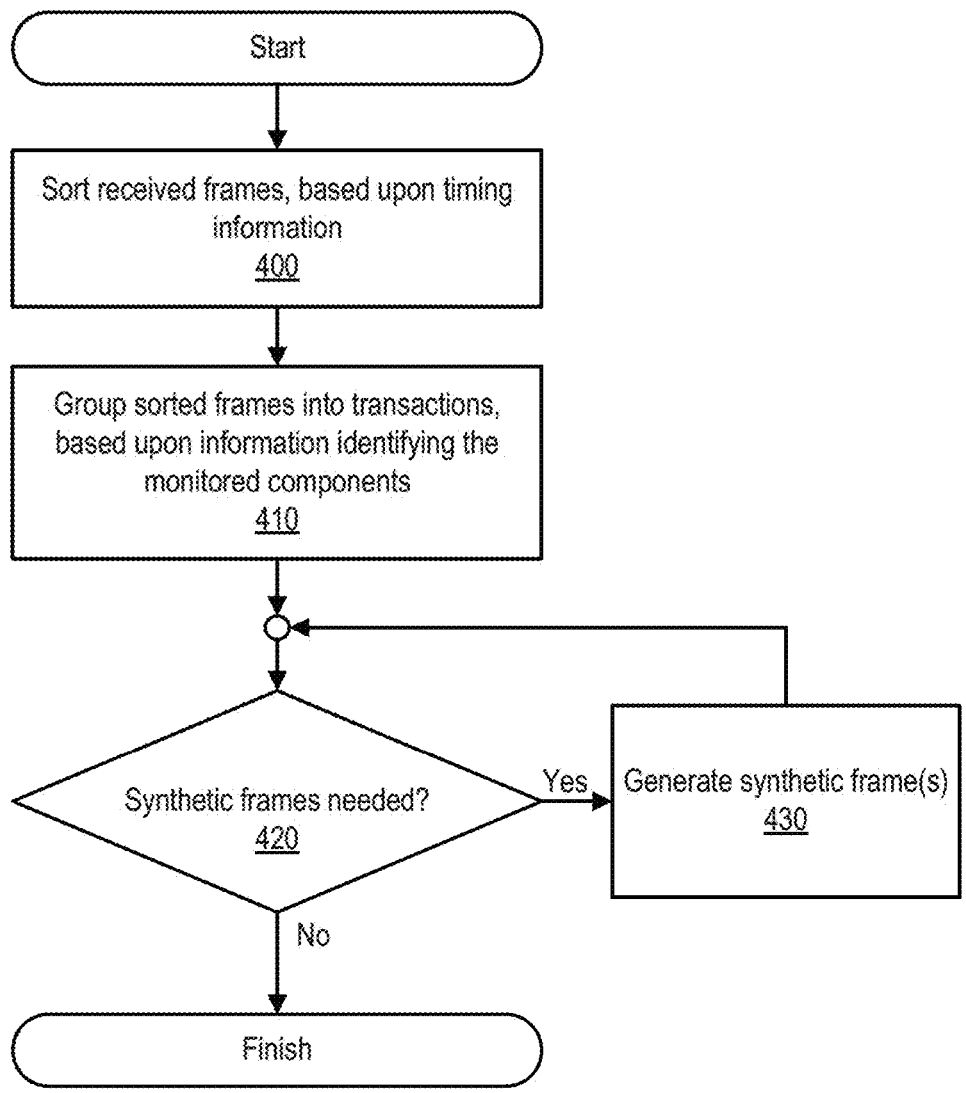
FIG. 8 is a flowchart of an example technique for organizing information that can be performed by an instrumentation broker.

FIG. 8 is a flowchart of an example technique performed, for example, by an instrumentation broker (e.g., instrumentation broker 70 of FIG. 1 or 2). Information received from individual instrumentation agents can be organized, each of which may be monitoring a different component and/or executing in a different computing device, into information describing a complete transaction that involves multiple components.

At 400, the received frames can be sorted based upon one or more items of timing information (e.g., such as timestamps) included in each frame. For example, the frames can be sorted based upon a timestamp included within each frame that indicates when the instrumentation agent that generated the frame began generating the frame. The timing information used to sort the frames can include timing information associated with requests and/or responses.

The sorted frames can be grouped into transactions, as shown at 410, such that each transaction includes one or more frames. The frames can be grouped based upon their sorted (based upon operation 400) position, as well as upon information within the frames that is usable to identify components that generated requests and/or responses identified in the frames. For example, one frame can indicate that a first component, as identified by an IP address and/or port, sent a request of size X at time T1. Another frame can indicate that a second component received a request of size Y at time T2 from a component identified by the first component's IP address and/or port. If X and Y are approximately the same (e.g., within a user-specified margin) and if the difference between T2 and T1 corresponds to a communication delay between the first and second component, it can be determined that these two frames describe the same request and are part of the same transaction.

As noted above, grouping frames into transactions can involve assigning the same transaction identifier to all frames within the same transaction. Additionally, relationships between frames can be established through the use of parent frame identifiers, as described above. These parent frame identifiers can be generated, for example, by the instrumentation broker and/or by instrumentation agents.

At 420, it can be determined whether any synthetic frames are needed. Performing operation 430 can involve processing the frames included in a particular transaction to see if any frames identify requests and/or responses received from and/or sent to components that are not directly monitored by instrumentation agents. In response to detecting one or more such frames within a transaction, the instrumentation agent creates one or more synthetic frames, as shown at 440. Synthetic frames can be generated using techniques such as those described in more detail above.

Figure 9:
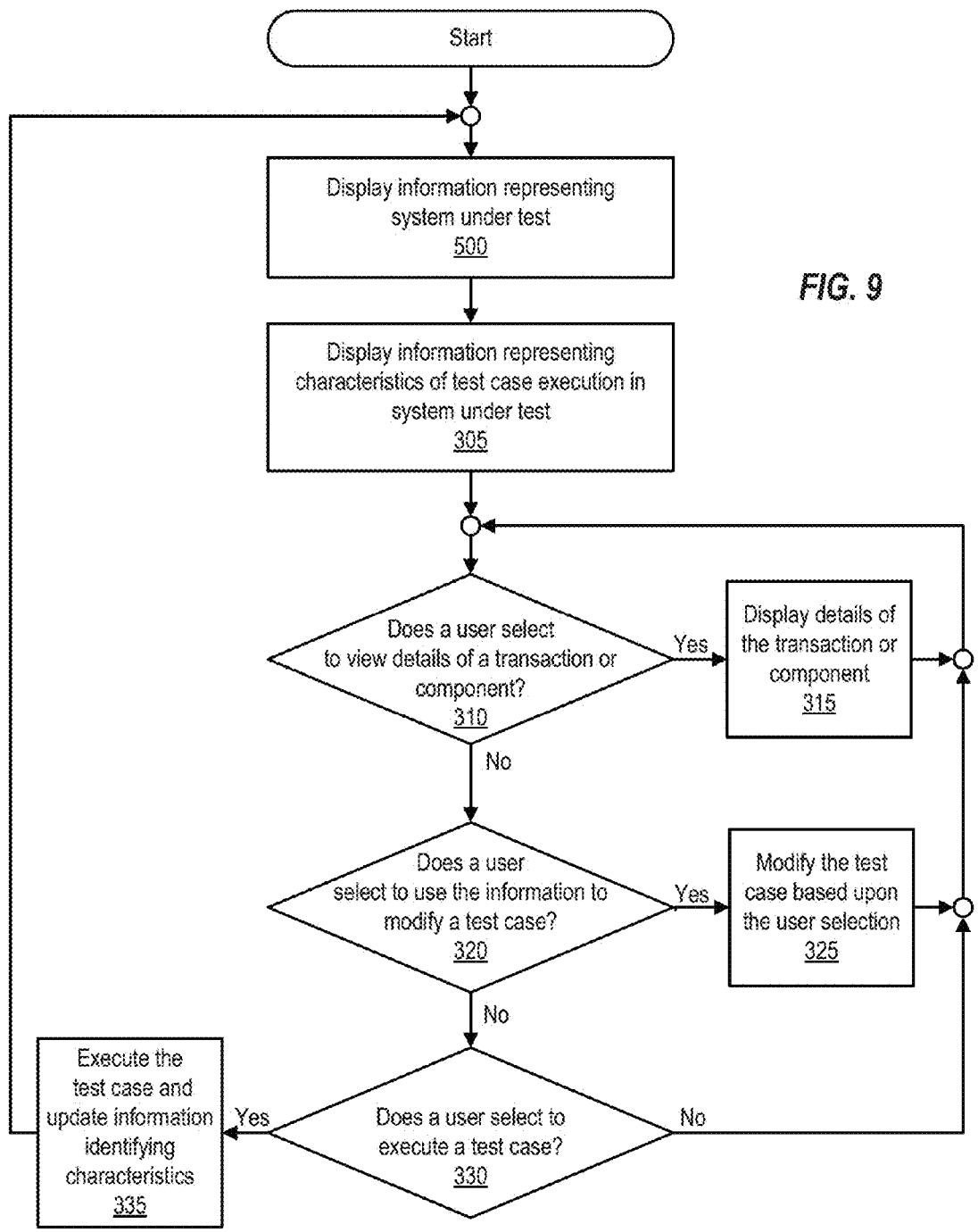
FIG. 9 is a flowchart of an example technique for generating a model of a system under test and allowing a user to interact with the system under test by interacting with the model.

FIG. 9 is a flowchart of an example technique for generating a model of a system under test from a database organized, for instance, by an instrumentation broker using data provided, for instance, from a plurality of instrumentation agents. The generated model can be adapted to allow a user to interact with the system under test by interacting with the model. Such a technique can be performed, for example, by a test module such as the one illustrated in FIG. 1.

The example technique begins at 500, when information is displayed to a user representing the system under test. This information can identify the components within the system, including components that do not directly interact with the test module. The test module can identify these components based upon characteristic information identifying which components sent and/or received various requests and/or responses during the execution of a test case, such that only those components that participated in the test case are identified. The information identifying the participating components can be generated by instrumentation modules distributed throughout the system under test and embedded within responses returned to the test module, as described above.

Performing operation 500 can involve compressing information contained in several frames into a single representation. For example, a component may have several sub-components, and a transaction may include a separate frame corresponding to each of the sub-components. The test module can generate a single representation (e.g., display text, icon, or the like) for the component, and display that single representation along with information obtained from one or more of the frames associated with the sub-components. This type of compression can be performed on service boundaries in some embodiments. In other instances, the presented system representation can generate separate representations for one or more of the sub-components. Further, the test module can generate user friendly names, graphic icons, and/or other representations for components or other components.

Information can also be displayed representing characteristics of the execution of a test case in the system under test, as shown at 505. This information can include information generated by instrumentation agents and/or information obtained by processing information generated by instrumentation agents. For example, the test module can generate a response time by calculating the difference between the time at which one component sent a request to another component and the time at which the other component returned a response to the requester.

The information displayed at 505 can also include information describing resource usage at a particular component when a particular request was received and/or when a particular response was generated, information describing the contents of a request or response, information identifying values generated by the component in response to receiving a particular request or as part of the process of generating a particular response, and the like.

The information displayed at 500 can be textual or graphical, or a combination of textual and graphical information. For example, as shown in FIG. 12, the information can include a graphical model of the system under test as well as text labels identifying various characteristics of the system under test.

The user can then manipulate the displayed information in order to view more details, modify a test case, or execute a test case. For example, the user can select one of the components identified as being part of the system under test during a particular test case in order to view more details regarding that component and its participation in the execution of the test case. In some embodiments, the test module provides functionality to graphically represent and allow user manipulation of a test case. Indeed, in some implementations, a test module can include functionality similar to that described, for instance, in U.S. patent application Ser. No. 11/328,509, titled "Graphical Model for Test Case Viewing, Editing, and Reporting," filed Jan. 9, 2006 and listing John J. Michelsen as an inventor, which is hereby incorporated by reference in its entirety as if completely and fully set forth herein.

Thus, if a user selects to view details of a transaction or component (e.g., by clicking on or otherwise selecting a graphical or textual representation of that transaction or component from the information displayed by the test module), as detected at 510, the selected details can be displayed to the user, as indicated at 515. Selected details can include details identifying a transaction (e.g., by transaction identifier) or component (e.g., by name and/or network address), details of request(s) received by and/or response(s) generated by a component, details regarding the component's performance (e.g., in terms of response time), details relating the component's performance to the performance of other components (e.g., by displaying a chart or graph that indicates the percentage of the total test case execution time that was due to that component), and the like.

If the user selects to use the information to modify a test case, as detected at 520, the test case is modified based upon the user input, as shown at 525. For example, the characteristics displayed at 505 can each represent a test case property, and a user can select to add a filter or assertion to such a test case property. Filters can be used to modify certain properties. For example, a filter can be applied to a property in order to see how components that consume that property behave after that property is modified or to determine what happens if a particular property is forced to have a certain value. Assertions can be used to vary the flow of test case execution (e.g., by stopping execution of the test case) based upon a property (e.g., based upon whether the property has an expected value). Modifying a test case can involve editing an existing test case or creating a new test case.

As an example, a user can select a property representing a number of rows that were returned by a database in response to an SQL query and make an assertion based on the number of rows (e.g., to fail the test case if the number of rows is greater than a particular number). Similarly, the user can select a response time and make an assertion based upon that response time (e.g., to fail the test case if the response time exceeds 2 ms). Similarly, the user can select a particular component and make an assertion based upon whether that component is invoked during execution of the test case (e.g., to fail the test case if the component is not invoked).

If the user selects to execute a test case, as detected at 530, the test module executes the test case (this test case may have been modified at 525). Execution of a new test case can cause new characteristic information to be generated by the instrumentation agents within the system under test and that new characteristic information to be organized by an instrumentation broker. Accordingly, in response to executing a test case, the test module can update its display by reperforming one or both of operations 500 and 505 with the new information provided by the instrumentation modules during execution of the test case.

While FIG. 9 shows certain operations being performed serially, it is noted that such operations can alternatively be performed in a different order or in parallel. For example, operations 510, 520, and 530 can be performed in parallel. Similarly, some operations can be omitted in certain scenarios (e.g., a user may choose to view detailed information at 515 but not to execute a test case at 535).

Figure 10:
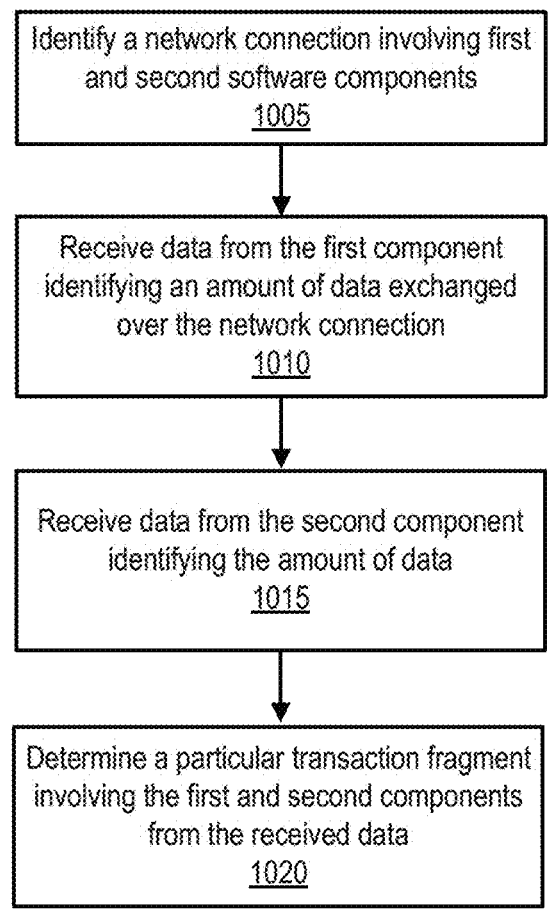
FIG. 10 is a flowchart of another example technique for organizing information that can be performed by an instrumentation broker.

FIG. 10 is a simplified flowchart 1000 illustrating an example technique for identifying 1005 a particular transaction fragment from network connection data in a computer testing environment. First data can be received 1010 from the first component identifying an amount of data exchanged over the network connection (i.e., measured from the time the network connection was established between components). Second data can be received 1015 that identifies a similar, and in some cases substantially identical, amount of data exchanged over the network connection, or a network connection sharing at least some identified parameters as that identified in the network connection identified in the received first data. Such first and second data, in some instances, can be generated and/or collected by one or more instrumentation agents monitoring the first and second software components. Indeed, in some instances, the first and second data can be generated, respectively, using techniques similar to those described in connection with the example of FIG. 11 described below. A particular transaction fragment can be identified or determined 1020 that involves the first and second software components from the received data, including the identification, in the received (at 1010-1015) data of a similar, or in some cases, substantially identical amount of data exchanged over the network connection. In some instances, one or more of steps 1005-1020 can be performed by an instrumentation broker interacting with a plurality of instrumentation agents monitoring software components in a testing system.

In some instances, the network connection can itself be identified 1005 from the received first data and/or the second data, as well as the involvement of the first and second software components. In other instances, the network connection between first and second software components can be identified prior to the first data or second data being received 1010, 1015. In either instance, the network connection can be identified 1005 from data sent by instrumentation agents monitoring one or more of the first and second software components, such as network parameters including IP address data and/or port numbers of one or both of the software components involved in the connection.

Figure 11:
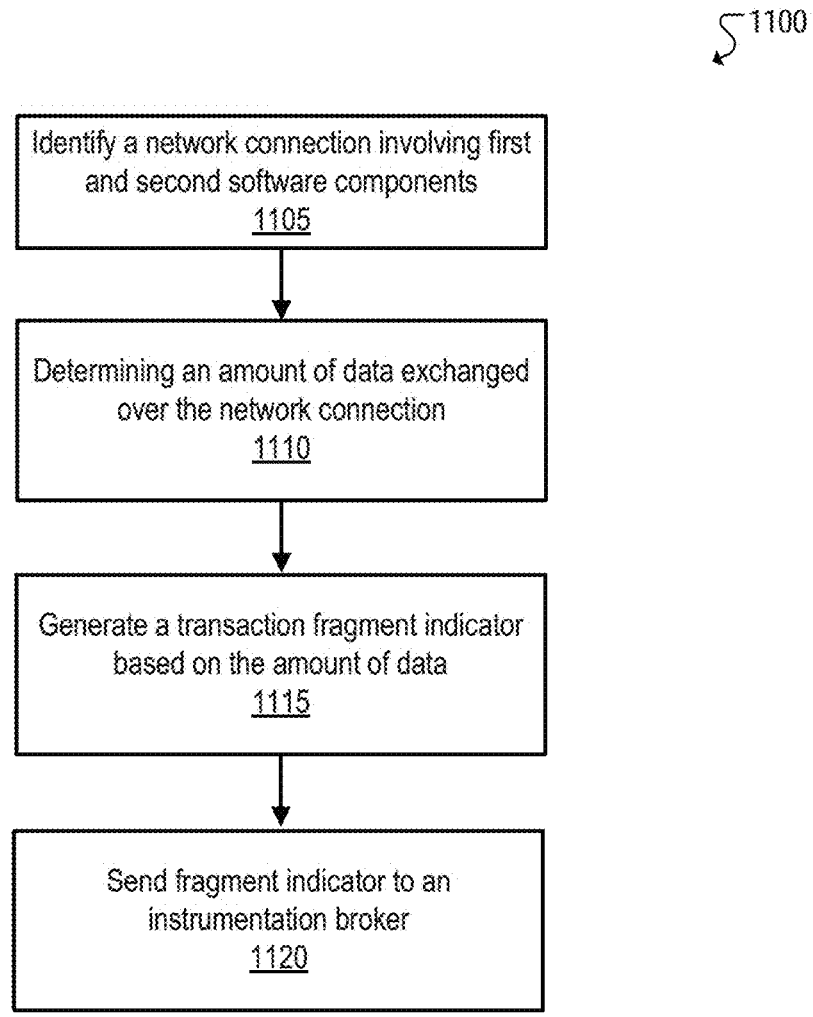
FIG. 11 is a flowchart of another example technique for generating information for use in modeling and testing that can be performed by an instrumentation agent.

FIG. 11 is a simplified flowchart 1000 illustrating an example technique for assisting an instrumentation broker in the identification of one or more transaction fragments within a software testing environment. For example, a particular network connection can be identified 1105 that involves a first software component and a second software component. Parameters and characteristics of the particular network connection can be identified as well, for instance using one or more agents, to identify, among other network parameters, the IP address data and/or port numbers of one or both of the first and second software components. Further, an amount of data exchanged over the network connection (from the time the network connection was established) can be calculated, observed, identified, observed, or otherwise determined 1110, for instance, using an agent monitoring either one of the first and second software components. A transaction fragment indicator can be generated 1115 based on the determined amount of data and sent 1120 to an instrumentation broker for use in connection with the identification of one or more transaction fragments by the instrumentation broker, such as using a technique similar to the example technique described in connection with FIG. 10. In some cases, the transaction fragment indicator can be included in a frame sent to the instrumentation broker by a corresponding instrumentation agent for use by the instrumentation broker, such as in techniques similar to those described in connection with FIG. 10.

FIG. 12 is a block diagram of an example user interface display window that can display a model of a test system and allow a user to interact with the test system via the model. As shown, the display window 600 includes a test case window 601, test case execution history window 602, a graphical model of a system under test 603, details options 604, and details window 605. Other displays can be used instead of and/or in addition to the one shown in FIG. 12, which is merely provided as an example.

The test case window 601 provides details of the current test case (e.g., including the steps (e.g., as selected by selecting "steps"), filters (e.g., as selected by selecting "filters"), and assertions (e.g., as selected by selecting "assertions") included in the test case), as well as options to see additional details (e.g., by selecting to view base information (by selecting "info") or to select another view (by selecting "views") of the test case information).

Test case execution history window 602 can include information identifying the prior execution of the test case, including properties that resulted from the test case. This information can include information obtained by instrumentation agents and organized by an instrumentation broker. Test case execution history window can also include options to run (by selecting "run") the test case again and/or to modify the settings (by selecting "settings") of the test case.

The graphical model 603 of the system under test can include information identifying each component that participated in the execution of the test case (as identified by the instrumentation modules in the system under test during execution of that test case), as well as some characteristic information, such as response times T1-T3 (which can also be derived from characteristic information generated by the instrumentation modules). In this example, each component is represented as a block and each transaction is represented as a line connecting two blocks.

Details options 604 can include selectable options that allow a user to select a component and/or transaction in graphical model 603 and then see corresponding details. For example, a user can select to see basic information (by selecting "base info") identifying a component or transaction, details about log messages generated by a particular component during execution of the test case (by selecting "log msgs"), details regarding the timing and/or contents of a particular request (by selecting "request"), details regarding the timing and/or contents of a particular response (by selecting "response"), details regarding EJB3s involved in a particular transaction (by selecting "EJB3"), details regarding the SQL statements or queries made by a particular component (by selecting SQLs), a summary (e.g., by selecting "SQL summary") of the SQL activity (e.g., a summary of the number of rows returned in response to an SQL query or the like), the raw XML content included in a particular request or response (by selecting "raw XML"), or the details of a document object model (DOM) tree representing the XML content included in a particular request or response (by selecting "DOM tree"). Details window can display the details selected by user selection of one of details options 604.

Figure 13:
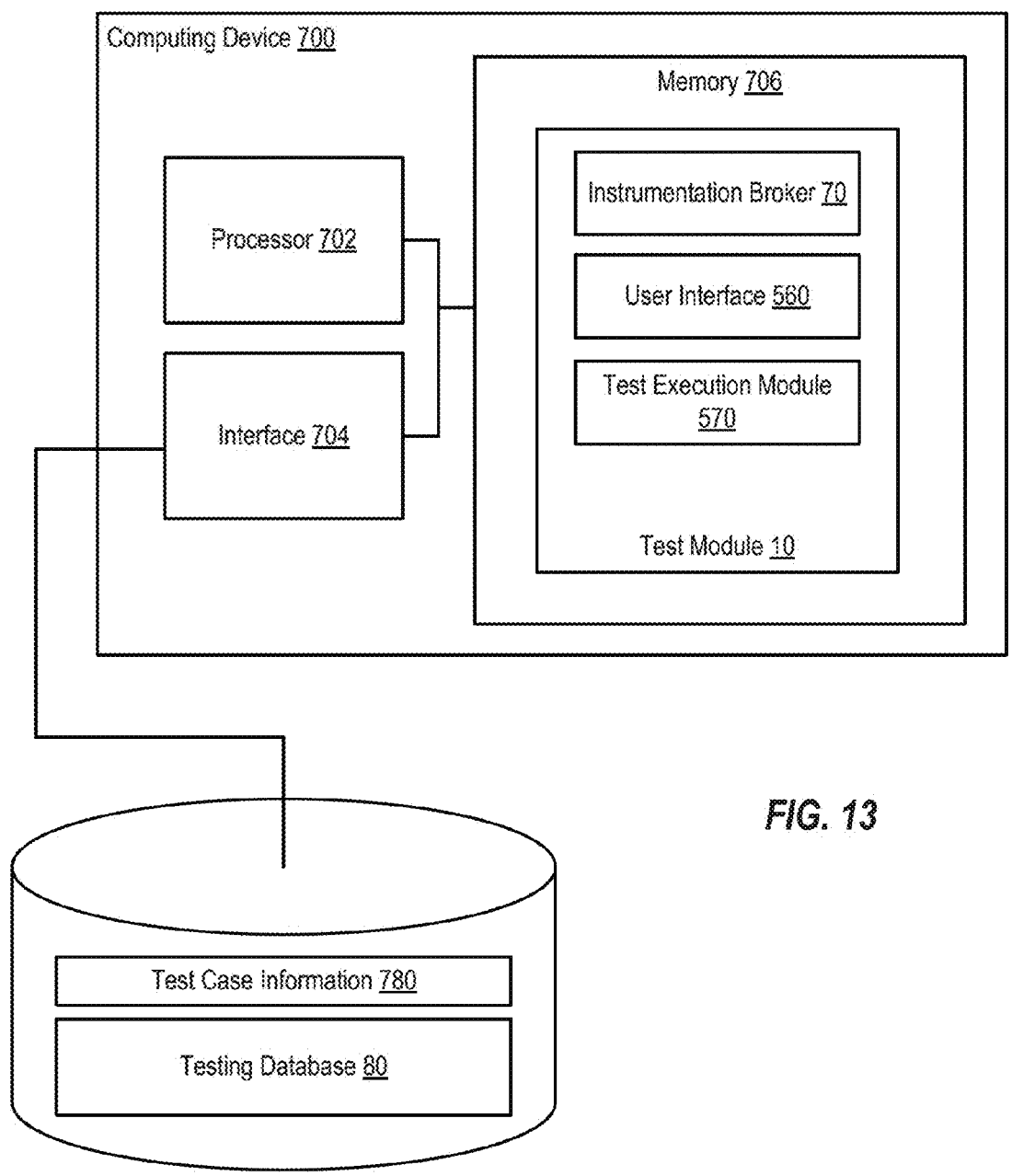
FIG. 13 is a block diagram of a computing device, illustrating how an instrumentation broker and other components of a test module can be implemented in software.

FIG. 13 is a block diagram of a computing device, illustrating one example of a software implementation of an example instrumentation broker and other components of a testing system. As shown, a computing device 700 can include a processor 702 (e.g., a microprocessor, programmable logic device (PLD), or application specific integrated circuit (ASIC), or multiple such processors), one or more interfaces 704, and memory 706. Instructions executable by processor 702 are stored in memory 706. These instructions are executable to implement test module 10. Computing device 700 can be a personal computer, server, personal digital assistant, cell phone, laptop, workstation, or the like. Memory 706 can each include various types of computer readable storage media, such as RAM (Random Access Memory), ROM (Read Only Memory), Flash memory, MEMS (Micro Electro-Mechanical Systems) memory, and the like. Processor 702, memory 706, and interface(s) 704 are coupled to send and receive data and control signals by a bus or other interconnect.

Interfaces 704 can each include an interface to a storage device on which instructions and/or data (e.g., such as data identifying a test case or a testing database, including characteristic information generated by one or more instrumentation agents and organized by an instrumentation broker) are stored. Interfaces 704 can also each include an interface to a network, such as a local area network (LAN) or wide area network (WAN) such as the Internet, for use in communicating other devices and components. Such an interface can allow test module 10 to send requests to and receive responses from services and other test system components via a network. Similarly, such an interface can allow an instrumentation broker to receive frames generated by instrumentation agents. Interface 704 can also include interfaces to various peripheral Input/Output (I/O) devices, such as a monitor, on which a graphical display (e.g., allowing a user to view a model and control the testing of system under test by interacting with the model) can be displayed.

Test module 10 includes instrumentation broker 70, user interface 760, and test execution module 770. Instrumentation broker 70 is configured to receive frames, which contain characteristic information generated by instrumentation agents, and to organize those frames for storage in testing database 80. Multiple sets of transactions can be maintained in testing database 80. Furthermore, multiple sets of test case results, each including one or more transactions, can be stored in testing database 80.

User interface 760 is configured to access testing database 80 and then use that information to display at least some of the information (e.g., in the form of a graphical model like that described above) to a user, as well as to allow the user to interact with that information in order to modify a test case. If a user selects to modify a test case, user interface 760 can store the results of the modification in test case information 780, which describes one or more test cases. Test Execution Module 770 is configured to execute test cases identified by test case information 780.

Program instructions and data implementing various software components such as test module 10 can be stored on various computer readable storage media such as memory 706. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium.

It is noted that the above figures illustrate specific examples. In other embodiments, different components can be used to implement the testing functionality described above. For example, while specific software components have been described as implementing specific functionality, this functionality can be implemented by different components than those depicted herein. For example, the functionality of test module 10 can be subdivided into multiple other test management components or integrated into another component. Furthermore, the specific components depicted in the figures herein can be combined or subdivided into fewer or additional components. Further element and components of the software tools and systems described herein can be implemented within composite, distributed, and cloud architectures and systems.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
identifying first data describing a first request sent by a first software component, wherein the first request is one of a plurality of requests sent by the first component, and the first data identifies an amount of data sent in association with the first request;
identifying second data describing a second request received by a second software component, wherein the second request is one of a plurality of requests received by the second component, and the second data identifies an amount of data received in association with the second request;
determining that the amount of data sent in association with the first request is substantially equal to the amount of data received in association with the second request; and
determining that the first data and the second data each reference a same particular request sent from the first software component to the second software component based on the amount of data associated with each of the first and second requests being substantially the same.

2. The method of claim 1, further comprising generating transaction fragment data for the particular request based on the first and second data, wherein the transaction fragment data is for use in modeling a flow of a transaction comprising the particular request.

3. The method of claim 1, wherein the plurality of requests sent by the first component correspond to a plurality of transactions involving the first component.

4. The method of claim 3, wherein the first component interacts with a plurality of other software components in the plurality of transactions, and the plurality of software components comprise the second software component.

5. The method of claim 1, further comprising:
identifying third data describing a first response sent by the second component to the first component, wherein the third data indicates characteristics of the first response; and
identifying fourth data describing a second response received by the first component from the second component, wherein the fourth data indicates characteristics of the second response.

6. The method of claim 5, further comprising determining that the first response and second response are different responses based on the characteristics indicated in the third and fourth data.

7. The method of claim 5, further comprising:
determining that the first response and second response are a same particular response based on the characteristics indicated in the third and fourth data; and
determining that the particular response is a response to the particular request.

8. The method of claim 7, wherein the third data indicates an amount of data sent by the second software component in association with the first response, the fourth data indicates an amount of data received by the first software component in association with the second response, and the first and second responses are determined to be the same particular response based on a determination that the amount of data sent by the second software component in association with the first response is equal to the amount of data received by the first software component in association with the second response.

9. The method of claim 1, wherein the first data describes an additional characteristic of the first request, the second data describes an additional characteristic of the second response, and determining that the first and the second data each reference the same particular request is further based on a determination of a commonality between the additional characteristic of the first request and the additional characteristic of the second response.

10. The method of claim 1, wherein each of the first and second data include an identification of a common network connection of the first and second components.

11. The method of claim 1, further comprising:
identifying third data describing a third request sent from the second software component to a third software component, wherein the third data identifies an amount of data sent by the second component in association with the third request;
identifying fourth data describing a fourth request received by the third component from a second software component, wherein the fourth data identifies an amount of data received by the third component in association with the fourth request;
determining that the amount of data sent in association with the third request is equal to the amount of data received in association with the fourth request; and
determining, that the third data and the fourth data each reference a same particular request sent from the second software component to the third software component based on the amount of data associated with each of the third and fourth requests being the same.

12. The method of claim 11, further comprising:
identifying an association between the second data and the third data; and
determining from the association that the particular request from the first component to the second component and the particular request from the second component to the third component are transaction fragments in a common transaction.

13. The method of claim 12, wherein the second and third data are received together from the second software component.

14. The method of claim 13, further comprising using the second and third data to determine an order of the first and second transaction fragments within the common transaction.

15. The method of claim 1, wherein the particular request comprises a first fragment in a transaction involving the first and second software components, the method further comprising generating at least a portion of a transaction tree identifying the first fragment as included within the transaction.

16. The method of claim 1, further comprising:
receiving sub-tree data from the first software component describing an additional transaction fragment identified by an agent corresponding to the first software component.

17. The method of claim 16, wherein the first fragment corresponds to a first thread executed at the first software component, and the additional transaction fragment corresponds to another thread initiated based on execution of the first thread.

18. The method of claim 1, wherein the first data is generated by a first agent interfacing with the first software component and the second data is generated by a second agent interfacing with the second software component.

19. A computer program product comprising a non-transitory computer readable storage medium comprising computer readable program code embodied therewith, the computer readable program code comprising:
   computer readable program code configured to identify first data describing a first request sent by a first software component, wherein the first request is one of a plurality of requests sent by the first component, and the first data identifies an amount of data sent in association with the first request;
   computer readable program code configured to identify second data describing a second request received by a second software component, wherein the second request is one of a plurality of requests received by the second component, and the second data identifies an amount of data received in association with the second request;
   computer readable program code configured to determine that the amount of data sent in association with the first request is substantially equal to the amount of data received in association with the second request; and
   computer readable program code configured to determine, that the first data and the second data each reference a same particular request sent from the first software component to the second software component based on the amount of data associated with each of the first and second requests being substantially the same.

20. A system comprising:
   a memory element storing data;
   a processor operable to execute instructions associated with the stored data;
   an instrumentation broker configured to:
   identify first data describing a first request sent by a first software component, wherein the first request is one of a plurality of requests sent by the first component, and the first data identifies an amount of data sent in association with the first request;
   identify second data describing a second request received by a second software component, wherein the second request is one of a plurality of requests received by the second component, and the second data identifies an amount of data received in association with the second request;
   determine that the amount of data sent in association with the first request is substantially equal to the amount of data received in association with the second request; and
   determining, that the first data and the second data each reference a same particular request sent from the first software component to the second software component based on the amount of data associated with each of the first and second requests being substantially the same.

21. The system of claim 20, further comprising:
   a model generator configured to generate a model of a particular transaction including the particular request, wherein the particular request comprises a fragment of the particular transaction, and the model is configured to be displayed on a computing device and is to comprise a graphical representation of the particular request sent from the first component to the second component.

22. The system of claim 20, further comprising:
   a first agent monitoring the first component to generate the first data; and
   a second agent monitoring the second component to generate the second data.

* * * * *